(12) United States Patent
Kamijima

(10) Patent No.: US 7,693,389 B2
(45) Date of Patent: Apr. 6, 2010

(54) ELECTRO-OPTIC DEVICE, METHOD FOR MANUFACTURING ELECTRO-OPTIC DEVICE, PROJECTOR, AND ELECTRONIC APPARATUS

(75) Inventor: Shunji Kamijima, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/672,392

(22) Filed: Feb. 7, 2007

(65) Prior Publication Data

US 2007/0200975 A1 Aug. 30, 2007

(30) Foreign Application Priority Data

Feb. 14, 2006 (JP) ............................. 2006-036688
Feb. 15, 2006 (JP) ............................. 2006-037574
Jan. 31, 2007 (JP) ............................. 2007-021412

(51) Int. Cl.
G02B 6/00 (2006.01)
G02B 27/10 (2006.01)
G02F 1/13 (2006.01)
G02F 1/1335 (2006.01)

(52) U.S. Cl. ................ 385/147; 359/621; 359/625; 349/95; 349/110; 349/112; 349/202

(58) Field of Classification Search .......... 349/95, 349/110, 112, 201, 202; 385/147; 359/621, 359/622, 625

See application file for complete search history.

(56) References Cited

U.S. PATENT DOCUMENTS 4,790,632 A * 12/1988 Miyakawa et al. ......... 349/95
5,151,801 A 9/1992 Hiroshima
5,467,208 A * 11/1995 Kokawa et al. ............ 349/67
6,147,737 A * 11/2000 Yachi ........................ 349/122
6,437,918 B1 * 8/2002 Hamanaka et al. ........ 359/620
6,657,700 B2 12/2003 Sako et al. ................ 349/158
6,876,408 B2 * 4/2005 Yamaguchi ................ 349/57
6,972,827 B2 * 12/2005 Mi ............................ 349/200
7,031,064 B2 * 4/2006 Kitamura et al. .......... 359/623
7,184,188 B2 * 2/2007 Kamijima ................. 359/237
7,339,638 B2 * 3/2008 Kitamura ................... 349/95
7,420,638 B2 * 9/2008 Tasaka et al. ............. 349/123
2002/0039157 A1 * 4/2002 Nakanishi et al. ......... 349/95
2004/0233354 A1 * 11/2004 Uehara et al. ............. 349/113
2006/0103779 A1 * 5/2006 Amemiya et al. ......... 349/95

FOREIGN PATENT DOCUMENTS

JP    A 03-170911    7/1991
JP    A 2004-347692  12/2004

OTHER PUBLICATIONS

Fukasawa T. et al., "Deep Dry Etching of Quartz Plate Over 100 μm in Depth Employing Ultra-Thick Photoresist (SU-8)," Jun. 2003, Jpn. J. Appl. Phys., vol. 42, pp. 3702-3706.

* cited by examiner

Primary Examiner—Tina M Wong
Assistant Examiner—Rhonda S Peace
(74) Attorney, Agent, or Firm—Oliff & Berridge, PLC

(57) ABSTRACT

An electro-optic device includes a pair of substrates, and an electro-optic material held between the pair of substrates, wherein one of the pair of substrates includes a condensing unit provided on the electro-optic material-side surface of the substrate in order to condense light incident on the substrate, and a functional layer provided to overlap at least the condensing unit in a plan view.

11 Claims, 19 Drawing Sheets

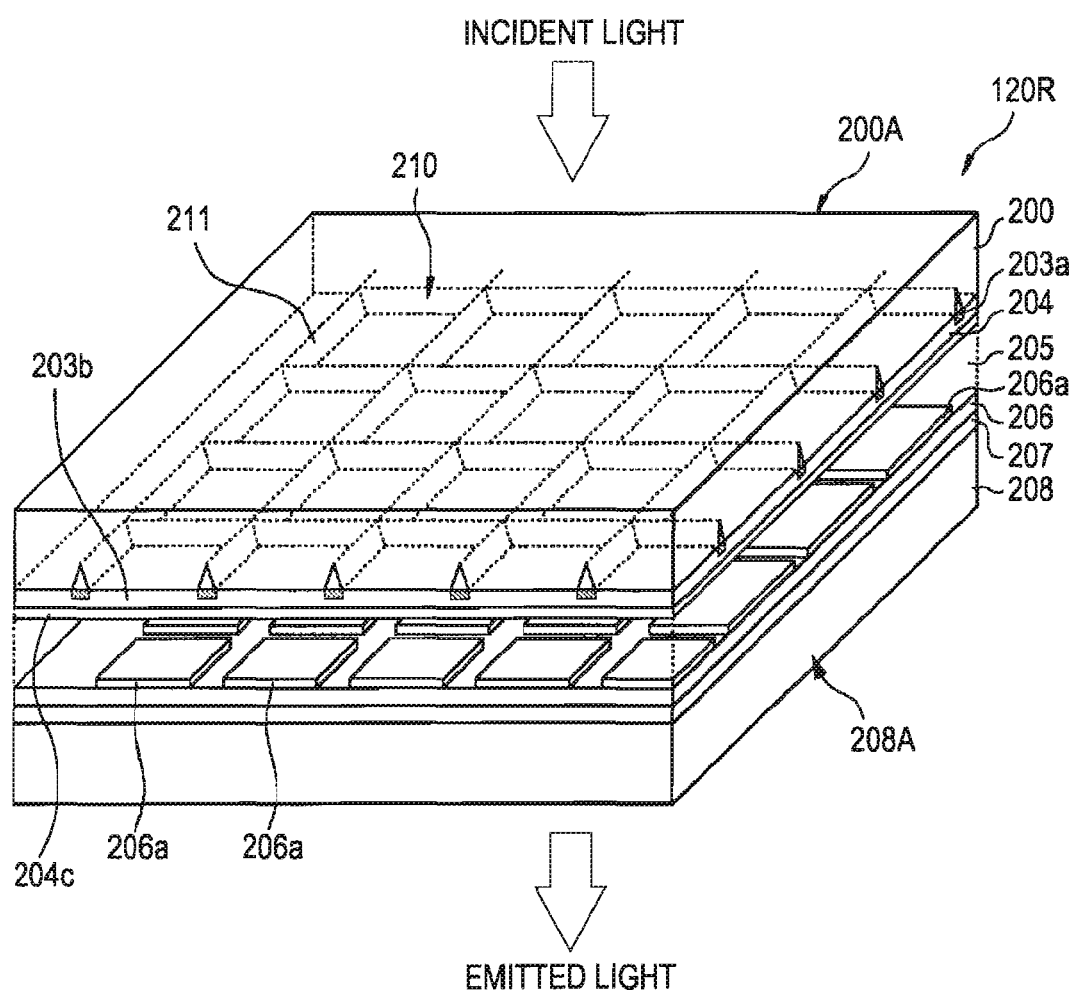

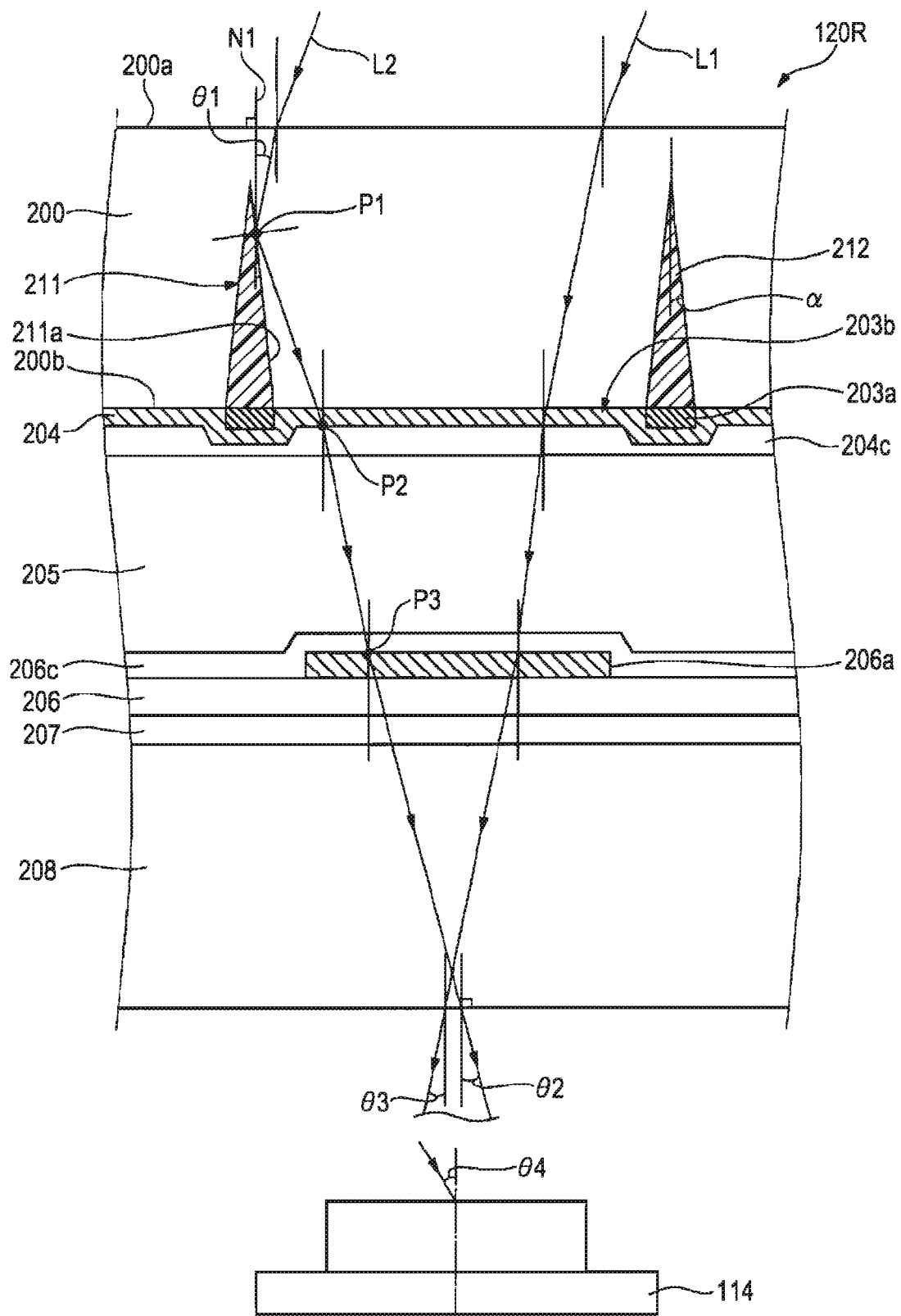

ELECTRO-OPTIC DEVICE, METHOD FOR MANUFACTURING ELECTRO-OPTIC DEVICE, PROJECTOR, AND ELECTRONIC APPARATUS

BACKGROUND

1. Technical Field

Several aspects of the present invention relates to an electro-optic device, a method for manufacturing an electro-optic device, a projector, and an electronic apparatus.

2. Related Art

An image display area of an electro-optic device used as a light valve of a projector includes a pixel region which emits light and a pixel-to-pixel region in which wiring is formed for supplying electric signals to the pixel region. For example, in a liquid crystal device, the pixel-to-pixel region is generally covered with a light-shielding portion to prevent transmission of light in this region.

In such an electro-optic device, preferably, the quantity of light emitted from the pixel region is as large as possible and the emitted light is bright light, and it is desired to realize high light utilization efficiency. For example, Japanese Unexamined Patent Application Publication No. 3-170911 discloses a liquid crystal device using an optical element having a wedge groove in a pixel-to-pixel region. The optical element is provided on one of a pair of opposing substrates of the liquid crystal device so that light transmitted through the pixel-to-pixel region is reflected by the groove to the inside of the pixel region, i.e., the groove functions as a prism. As a result, the light utilization efficiency is increased.

However, the groove is provided in the pixel-to-pixel region of the substrate surface and thus overlaps a region in which the light-shielding portion is formed. When the groove is formed in the substrate surface, the light-shielding portion may be deformed or broken due to sinking in the groove. Therefore, a cover glass is attached to the substrate surface in which the groove is formed so that the light-shielding portion is formed on the cover glass.

However, when the cover glass is attached, the thickness of a liquid crystal device is increased by an amount corresponding to the thickness of the cover glass. In addition, in the configuration shown in FIG. 5 of Japanese Unexamined Patent Application Publication No. 3-170911, reflected light is transmitted through the cover glass and is applied to the light-shielding portion, thereby decreasing the light utilization efficiency. Furthermore, the cost is increased by attaching the cover glass.

SUMMARY

An advantage of some aspects of the invention is that the invention provides a low-cost thin electro-optic device exhibiting excellent light utilization efficiency, a method for manufacturing an electro-optic device, a projector, and an electronic apparatus.

In accordance with an embodiment of the invention, an electro-optic device includes a pair of substrates, and an electro-optic material held between the pair of substrates. One of the pair of substrates includes a condensing unit provided on the electro-optic material-side surface of the substrate in order to condense light incident on the substrate, and a functional layer provided to overlap at least the condensing unit in a plan view.

In accordance with another embodiment of the invention, an electro-optic device includes a pair of substrates, and an electro-optic material held between the pair of substrates. One of the pair of substrates includes a prism element provided on the electro-optic material-side surface of the substrate in order to condense light incident on the substrate, the prism element having a groove formed in the surface thereof and filled with a filler, and a functional layer provided to overlap at least the surface of the filler in a plan view.

The term "electro-optic device" is a general term including a device having the electro-optic effect that the refractive index of a material is changed by an electric field to change light transmittance, a device in which electric energy is converted to optical energy, and the like. Specific examples of the electro-optic device include a liquid crystal display using a liquid crystal as an electro-optic material, an organic EL (Electro-Luminescence) device using organic EL, an inorganic EL device using inorganic ET, a plasma display device using plasma gas as an electro-optic material, and the like. Further, an electrophoretic display (EPD), a field emission display (FED), and the like are included. The term "functional layer" represents a layer provided for making the electro-optic device function, such as a light-shielding portion and an electrode layer provided on a substrate constituting the electro-optic device.

The filler such as a fluid material, e.g., a resin material or sol-gel glass, or a fine solid (powdered) material, is provided to fill in the groove of the prism element. Therefore, when the functional layer used in the electro-optic device is disposed on the filler, the filler functions as a bed for supporting the functional layer. Since the filler holds the functional layers a cover glass is not attached to the substrate surface, thereby providing a low-cost thin electro-optic device exhibiting excellent light utilization efficiency.

The functional layer is preferably a light-shielding portion.

For example, when a prism element is provided in a pixel-to-pixel region of an electro-optic device, a light-shielding portion may be provided to overlap the prism element. In a general configuration in which a light-shielding portion is provided on a cover glass, a prism and the light-shielding portion are spaced in the height direction from the substrate surface, and thus light transmitted through the substrate provided with the prism element may be absorbed by the light-shielding portion disposed on the cover glass. However, in accordance with an embodiment of the invention, the light-shielding portion is formed directly on the filler, thereby decreasing the quantity of light absorbed by the light-shielding portion.

The filler is preferably a fluid material.

When a fluid material is used as a constituent material of the filler, it may be possible to easily fill the groove and easily planarize the surface of the filler material. It is also preferable that the surface of the filler is flush with the surface of the substrate. Since the surface of the filler is flush with the surface of the substrate, it may be possible to provide the functional layer on a flat surface, for example, when the functional layer is provided over the filler and the substrate surface.

The refractive index of the filler is preferably different from that of the substrate.

When the refractive index of the filler differs from that of the substrate, light incident on the groove from the inner side of the substrate is completely reflected. Consequently, light may be efficiently utilized.

It is more preferable that the filler is composed of a material having a lower refractive index than that of the substrate.

The filler is composed of a material having a lower refractive index than that of the substrate, and thus light incident on the groove from the inner side of the substrate may be easily completely reflected over a wide incidence angle. Consequently, light may be more efficiently utilized.

It is also preferable that the filler contains a metal material or an opaque material other than a metal material.

The filler contains a metal material, and thus light incident on the groove from the inner side of the substrate may be reflected. The filler containing a metal material or containing an opaque material such as ceramic, carbon, mineral, or the like also functions as the light-shielding portion of the electro-optic device. Therefore, the light-shielding portion need not be provided separately, thereby decreasing the cost.

It is also preferable that the thermal expansion coefficient of the filler is substantially the same as that of the substrate.

When the thermal expansion coefficients of the filler and the substrate greatly differ from each other, the substrate may be deformed to hinder the function of each functional element provided on the electro-optic device. On the other hand, when the thermal expansion coefficient of the filler is substantially the same as that of the substrate, it may be possible to avoid the hindrance of the function. For example, when an electro-optic device according to an embodiment of the invention is mounted on an apparatus used at a high temperature, such as a projector or the like, no distortion occurs due to thermal expansion between the substrate and the filler.

In accordance with a further embodiment of the invention, a method for manufacturing an electro-optic device including a pair of substrates and an electro-optic material held between the pair of substrates includes forming a groove in the electro-optic material-side surface of one of the pair of substrates to provide a prism element for condensing light incident on the substrate, filling the groove with a filler so as to provide a hollow portion in the groove, and disposing a functional layer constituting the electro-optic device on the surface of the filler so as to overlap at least the filler in a plan view. In accordance with a further embodiment of the invention, a method for manufacturing an electro-optic device including a pair of substrates and an electro-optic material held between the pair of substrates includes forming a groove in the electro-optic material-side surface of one of the pair of substrates to provide a prism element for condensing light incident on the substrate, pouring a fluid material into the groove, curing the fluid material poured into the groove, and disposing a functional layer constituting the electro-optic device so as to overlap at least the cured fluid material.

When the fluid material is poured into the groove constituting the prism element and then cured, the groove is easily filled with a filler, and the surface of the fluid material is easily planarized.

A light condensing substrate according to an embodiment of the invention includes a substrate having a groove formed therein and a first material disposed in the groove, the refractive index of the first material differing from that of the substrate.

The light condensing substrate may further include a second material provided corresponding to the groove. The second material may have a light shielding ability. In this case, the light-shielding portion is preferably provided to overlap the first material.

The light-condensing substrate may be used for an electro-optic device.

In accordance with a further embodiment of the invention, an electro-optic device includes a substrate having a groove formed therein, a first material disposed in the groove, and an electro-optic panel including a plurality of pixel electrodes, the groove being provided to overlap a region between two adjacent pixel electrodes among the plurality of pixel electrodes.

In the electro-optic device, the refractive index of the first material may be different from that of the substrate.

The electro-optic device may further include a second material disposed corresponding to the groove.

In the electro-optic device, the second material may nave a light-shielding ability.

In accordance with a further embodiment of the invention, a projector includes the above-described electro-optic device.

In accordance with a further embodiment of the invention, a projector includes a low-cost thin electro-optic device capable of a bright display, and thus it may be possible to provide a high-quality protector having high contrast and high display characteristics.

In accordance with a further embodiment of the invention, an electronic apparatus includes the above-described electro-optic device.

In accordance with a further embodiment of the invention, an electronic apparatus includes a low-cost thin electro-optic device capable of a bright display, and thus it may be possible to provide an electronic apparatus including a high-quality display portion having high contrast and high display characteristics.

BRIEF DESCRIPTION OF THE DRAWINGS

The invention will be described with reference to the accompanying drawings, wherein like numbers reference like elements.

FIG. 3 is a perspective view showing the whole configuration of the liquid crystal panel shown in FIG. 2.

FIG. 5 is a drawing illustrating the operation of a prism element.

DESCRIPTION OF EXEMPLARY EMBODIMENTS

First Embodiment (Projector)

First, the schematic configuration of a projector according to a first embodiment of the invention will be described.

Figure 1:
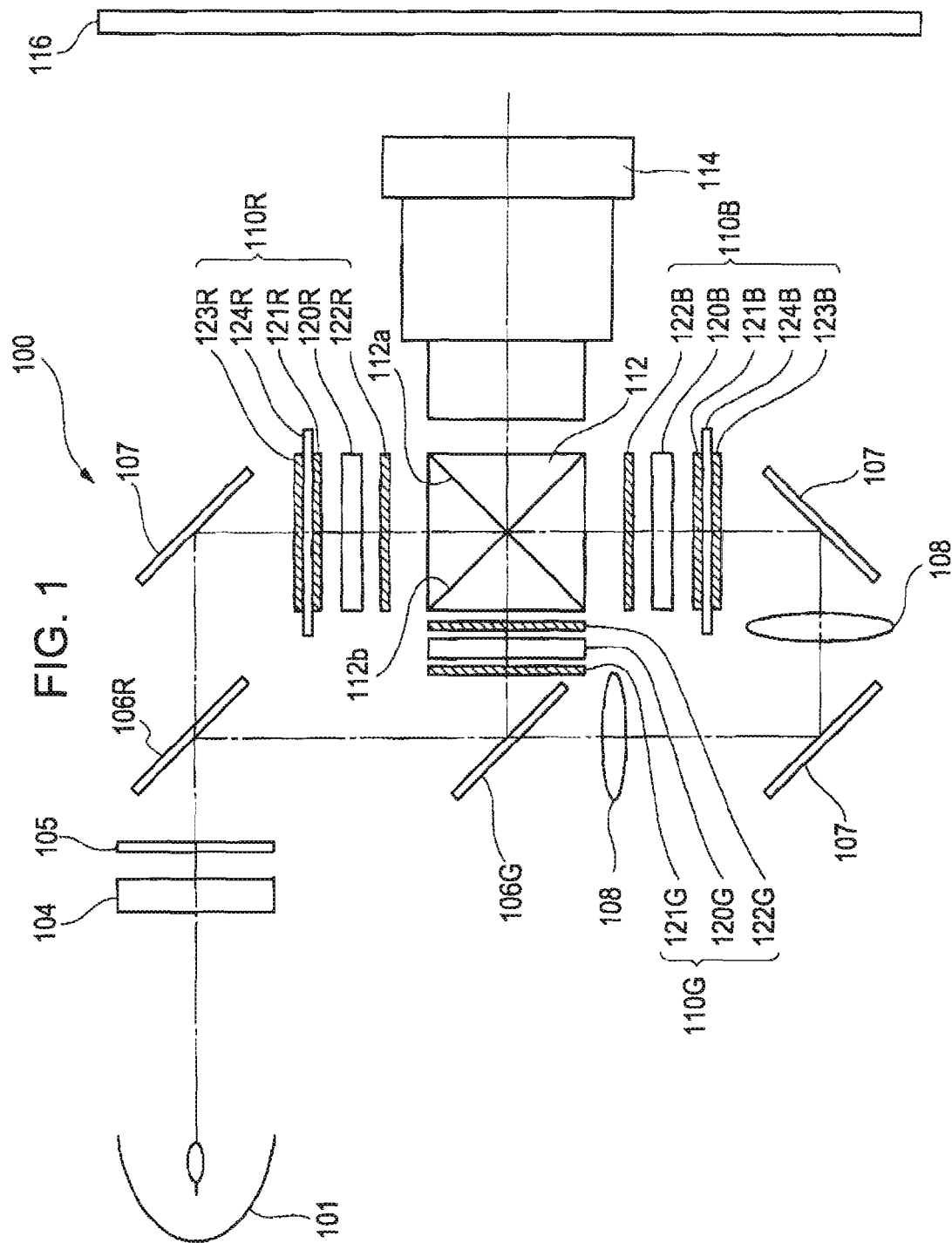
FIG. 1 is a drawing showing the whole configuration of a projector according to a first embodiment of the invention.

As shown in FIG. 1 an extra-high pressure mercury lamp 101 serving as a light source supplies light containing red light (referred to as "R light" hereinafter) as first color light, green light (referred to as "G light" hereinafter) as second color light, and blue light (referred to as "B light" hereinafter) as third color light. An integrator 104 makes uniform an illumination distribution of light supplied from the extra-high pressure mercury lamp 101. The light with a uniform illumination distribution is converted to polarized light having a specified vibration direction, for example, s-polarized light, by a polarization conversion element 105. The s-polarized light is incident on a R light transmitting dichroic mirror 106R constituting a color separation optical system. The R light will be described below. The R light transmitting dichroic mirror 106R transmits the R light and reflects the G light and B light. The R light transmitted through the R-light transmitting dichroic mirror 106R is incident on a reflection mirror 107. The reflection mirror 107 bends at 90° the optical path of the R light. The R light along the bent optical path is incident on a first color light spatial light modulator 110R for modulating the R light as the first color light according to an image signal. The first color light spatial light modulator 110R includes a transmissive liquid crystal display for modulating the R light according to an image signal. Even when light is transmitted through a dichroic mirror, the polarization direction of light is not changed, and thus the R light incident on the first color light spatial light modulator 110R remains as s-polarized light.

The first color light spatial light modulator 110R includes a λ/2 retardation film 123R, a glass plate 124R, a first polarization plate 121R, a liquid crystal panel 120R, and a second polarization plate 122R. The detailed configuration of the liquid crystal panel 120R will be described below. The λ/2 retardation film 123R and the first polarization plate 121R are disposed in contact with the light transmitting glass plate 124R which does not change the polarization direction. Therefore, it may be possible to avoid the problem of distorting the first polarization plate 121R and the λ/2 retardation film 123R due to generation of heat. Although, in FIG. 1, the second polarization plate 122R is independently provided, it may be provided in contact with the emission plane of the liquid crystal panel 120R or the incidence plane of a cross dichroic prism 112.

The s-polarized light incident on the first color light spatial light modulator 110R is converted to p-polarized light by the λ/2 retardation film 123R. The p-polarized light is transmitted through the glass plate 124R and the first polarization plate 121R and incident on the liquid crystal panel 120R. The p-polarized R light incident on the liquid crystal panel 120R is converted to s-polarized light by modulation according to an image signal. The s-polarized R light undergoing modulation by the liquid crystal panel 120R is emitted from the second polarization plate 122R. Then, the R light modulated by the first color light spatial light modulator 110R is incident on the cross dichroic prism 112 serving as a color synthesis optical system.

Next, the G light will be described. The optical path of the G light and B light reflected by the R light transmitting dichroic mirror 106R is bent at 90°. The G light and B light along the bent optical path are incident on a B light transmitting dichroic mirror 106G. The B light transmitting dichroic mirror 106G reflects the G light and transmits the B light. The G light reflected by the B light transmitting dichroic mirror 106G is incident on a second color light spatial light modulator 110G for modulating the G light as the second color light according to an image signal. The second color light spatial light modulator 110G includes a transmissive liquid crystal display which modulates the G light according to an image signal. The second color light spatial light modulator 110G includes a liquid crystal panel 120G, a first polarization plate 121G, and a second polarization plate 122G. Details of the liquid crystal panel 120G will be described below.

The G light incident on the second color light spatial light modulator 110G has been converted to s-polarized light. The s-polarized light incident on the second color light spatial light modulator 110G is transmitted through the first polarization plate 121G and incident on the liquid crystal panel 120G. The s-polarized light incident on the liquid crystal panel 120G is converted to p-polarized G light by modulation according to an image signal. The p-polarized G light undergoing modulation by the liquid crystal panel 120G is emitted from the second polarization plate 122G. Then, the G light modulated by the second color light spatial light modulator 110G is incident on the cross dichroic prism 112 serving as the color synthesis optical system.

Next, the B light will be described. The B light transmitted through the B light transmitting dichroic mirror 106G passes through two relay lenses 108 and two reflection mirrors 107 and is then incident on a third color light spatial light modulator 110B for modulating the B light as the third color light according to an image signal. The third color light spatial light modulator 110B includes a transmissive liquid crystal display which modulates the B light according to an image signal.

The reason for passing the B light through the relay lenses 108 is that the length of the optical path of the B light is longer than those of the R light and the G light. By using the relay lenses 108, the B light transmitted through the B light transmitting dichroic mirror 106G is guided to the third color light spatial light modulator 110B as it is. The third color light spatial light modulator 110B includes a λ/2 retardation film 123B, a glass plate 124B, a first polarization plate 121B, a liquid crystal panel 120B, and a second polarization plate 122B. Since the configuration of the third color light spatial light modulator 110B is the same as the first color light spatial light modulator 110R, detailed description thereof is omitted.

The B light incident on the third color light spatial light modulator 110B has been converted to s-polarized light. The s-polarized light incident on the third color light spatial light modulator 110B is converted to p-polarized light by the λ/2 retardation film 123B. The p-polarized B light is transmitted through the glass plate 124B and the first polarization plate 121B and incident on the liquid crystal panel 120B. The p-polarized light incident on the liquid crystal panel 120B is converted to s-polarized B light by modulation according to an image signal. The s-polarized B light undergoing modulation by the liquid crystal panel 120B is emitted from the second polarization plate 122B. Then, the B light modulated by the third color light spatial light modulator 110B is incident on the cross dichroic prism 112 serving as the color synthesis optical system. As a result, the light supplied from the extra-high pressure mercury lamp 101 is separated into the R light as the first color light, the G light as the second color light, and the B light as the third color light by the R light transmitting dichroic mirror 106R and the B light transmitting dichroic mirror 106G serving as the color separation optical system.

The cross dichroic prism 112 serving as the color synthesis optical system includes two dichroic films 112a and 112b which are crossed in a X-like form. The dichroic film 112a reflects the B light and transmits the G light, while the dichroic film 112b reflects the R light and transmits the G light. The cross dichroic prism 112 combines the R light, the G light, and the B light which are modulated by the first color light spatial light modulator 110R, the second color light spatial light modulator 110G, and the third color light spatial light modulator 110B, respectively.

A projection lens 114 projects the light synthesized by the cross dichroic prism 112 on a screen 116. As a result, a full color image is obtained on the screen 116.

As described above, light incident on the cross dichroic prism 112 from each of the first color light spatial light modulator 110R and the third color light spatial light modulator 110B is set to be s-polarized light. On the other hand, light incident on the cross dichroic prism 112 from the second color light spatial light modulator 110G is set to be p-polarized light. In this way, when light incident on the cross dichroic prism 112 has different polarization directions, it may be possible to effectively combine the light emitted from the color light spatial light modulators in the cross dichroic prism 112. The dichroic films 112a and 112b generally have an excellent reflection property for s-polarized light. Therefore, the R light and the B light reflected by the dichroic films 112a and 112b are set to be s-polarized light, and the G light transmitted through the dichroic films 112a and 112b is set to be p-polarized light.

(Liquid Crystal Panel)

Figure 2:
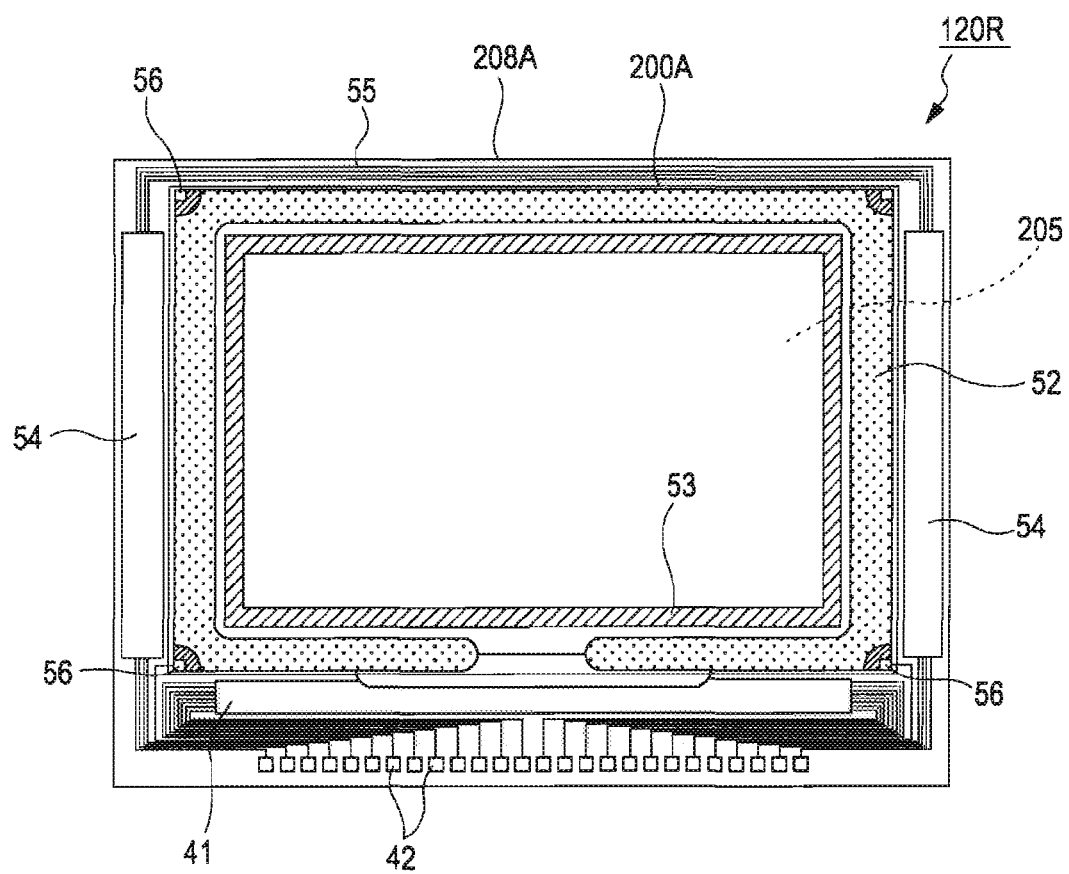
FIG. 2 is a drawing showing the whole configuration of a liquid crystal panel shown in FIG. 1.

Next, a liquid crystal panel (electro-optic device) will be described in detail with reference to FIGS. 2 and 3. The projector 100 described with reference to FIG. 1 includes the three liquid crystal panels 120R, 120G, and 120B. These three liquid crystal panels 120R, 120G, and 120B have the same basic configuration except that the wavelength regions of light to be modulated are different. Therefore, the liquid crystal panel 120R will be described below as an example. FIG. 2 is a plan view showing the configuration of the liquid crystal panel 120R, and FIG. 3 is a perspective sectional view of the liquid crystal panel 120R.

As shown in FIG. 2, the liquid panel 120R includes a TFT array substrate 208 and a counter substrate 200 which are laminated and bonded together with a sealant 52 provided therebetween. A liquid crystal layer 205 is sealed in a region defined by the sealant 52. Further, a peripheral partition 53 composed of a light-shielding material is formed inside the formation region of the sealant 52.

In a region outside the sealant 52, a data line driving circuit 41 and external circuit mounting terminals 42 are formed along one of the sides of the TFT array substrate 208, and scanning line driving circuits 54 are formed along the two sides adjacent to the one side. In addition, a plurality of wirings 55 is provided along the remaining side of the TFT array substrate 208, for connecting the scanning line driving circuits 54 provided on both sides of an image display region. Further, an inter-substrate conducting material 56 is provided at each of the corners of the counter substrate 200, for making electric conduction between the TFT array substrate 208 and the counter substrate 200.

Instead of forming the data line driving circuit 41 and the scanning line driving circuits 54 on the TFT array substrate 208, for example, a TAB (Tape Automated Bonding) substrate on which driving LSI is mounted and a terminal group formed in the periphery of the TFT array substrate 208 may be electrically and mechanically connected through an anisotropic conductive film.

As shown in FIG. 3, groove-shaped prism elements 211 are formed in the inner surface of the counter substrate 200. Also, a light-shielding portion 203a and a common electrode 204 are formed on the inner surface of the counter substrate 200, and an alignment film 204c is formed on the surface of the common electrode 204.

The light-shielding portion 203a is formed in a lattice form on the prism elements 211 so that each of the rectangular regions surrounded by the light-shielding portion 203a is an aperture 203b. Further, a prism group 210 including a plurality of prism elements 211 is formed in the counter substrate 200.

TFT substrate 206 is fixed to the inner surface of the TFT array substrate 208 through a transparent adhesive layer 207. Further, pixel electrodes 206a, TFTs (Thin Film Transistor, refer to FIG. 4) 206b for driving the pixel electrodes 206a, and an alignment film 206c are formed on the TFT substrate 206.

The pixel electrodes 206a are provided in regions overlapping the respective apertures 203b in a plan view. Alternatively, the grooves and the light-shielding portion 203a corresponding to the prism elements 211 are provided to overlap the regions between the two respective adjacent pixel electrodes 206a. In addition, the TFTs 206b and wiring (not shown in the drawing) for supplying electric signals to the TFTs are provided in regions overlapping the light-shielding portion 203a in a plan view. The alignment film 206c is formed on the surfaces of the pixel electrodes 206a and the TFTs 206b (refer to FIG. 4).

The liquid crystal layer 205 for image display is sealed between the alignment films 206c and 204c. The R light emitted from the extra-high pressure mercury lamp 101 is incident on the liquid crystal panel 120R from an upper portion of FIG. 3, transmitted in order through the apertures 203b, the common electrode 204, the alignment film 204c, the liquid crystal layer 205, the alignment film 206c, the pixel electrodes 206a, and the TFT substrate 206, and then emitted from the TFT array substrate side toward the screen 116. In this case, a polarized component of the R light is modulated by the liquid crystal layer 205 (light modulation element).

In the configuration shown in FIG. 1, the first polarization plate 121R and the second polarization plate 122K are provided separately from the liquid crystal panel 120K. However, instead of this, polarization plates may be provided between the counter substrate 200 and the common electrodes 204 and between the TFT array substrate 203 and the TFT substrate 206. Further, the prism group 210 may be formed in the first polarization plate 121R.

(Prism Element)

Figure 4A:
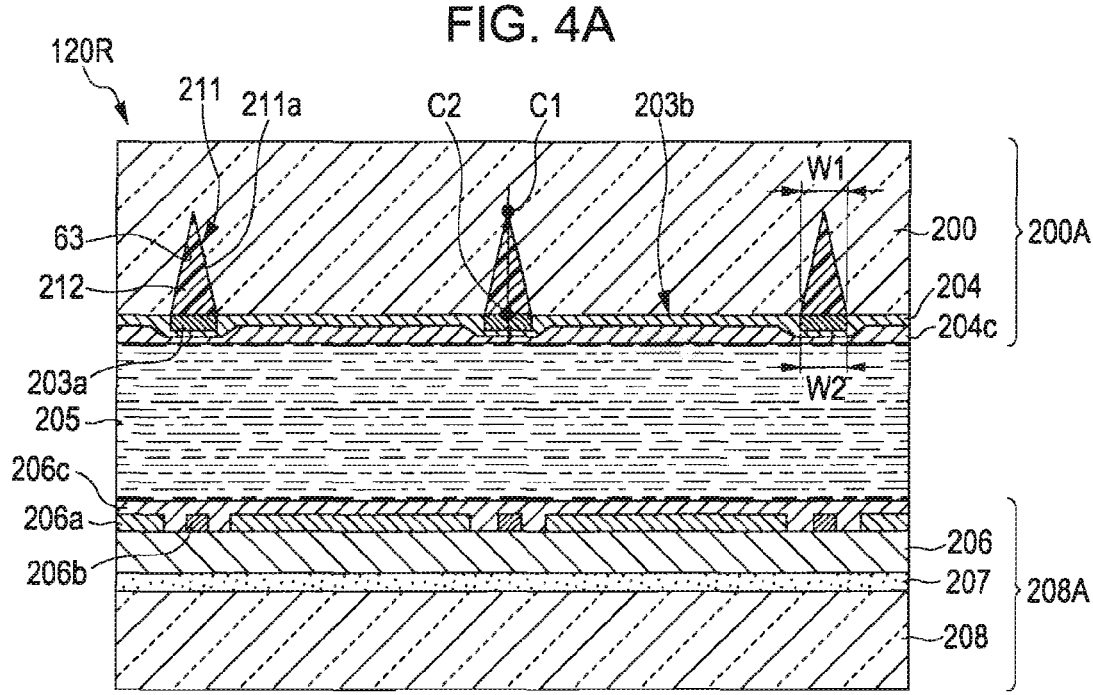
FIGS. 4A and 4B are partial sectional views showing the configuration of the liquid crystal panel shown in FIG. 2.

FIG. 4A is a sectional view showing the configuration of the liquid crystal panel 120R.

Each prism element 211 includes an optical path deflecting portion having a groove 63 which is formed to extend inward from the inner surface of the counter substrate 200, the groove 63 being filled with a filler 212 composed of, for example, an acrylic resin as a raw material. The prism elements 211 have an isosceles triangular section.

The refractive index (1.40) of the acrylic resin material constituting the filler 212 is lower than that (1.46) of the counter substrate 200. Therefore, light transmitted through the counter substrate 200 is completely reflected by the inclined surfaces 211a constituting the oblique sides of the isosceles triangle.

The filler 212 may be composed a transparent resin material other than the acrylic resin, or example, an epoxy resin, a melamine resin, or a polyimide resin. Since the acrylic resin is easily cured within a short time by light irradiation using a precursor and a sensitizer (photopolymerization initiator), the acrylic resin is preferably used. An ultraviolet curable resin exhibits low curing shrinkage and is effective in securing reliability and shape stability of the prism elements 211. An example of the basic composition of the acrylic resin includes a prepolymer or oligomer, a monomer, and a photopolymerization initiator.

Examples usable as the prepolymer or oligomer include acrylates such as epoxy acrylates, urethane acrylates, polyester acrylates, polyether acrylates, and spiroacetal acrylates; and methacrylates such as epoxy methacrylates, urethane methacrylate, polyester methacrylates, and polyether methacrylates.

Examples usable as the monomer include monofunctional monomers such as 2-ethylhexyl acrylate, 2-ethylhexyl methacrylate, 2-hydroxyethyl acrylate, 2-hydroxymethyl methacrylate, N-vinyl-2-pyrrolidone, carbitol acrylate, tetrahydrofurfuryl acrylate, isobornyl acrylate, dicyclopentenyl acrylate, and 1,3-butanediol acrylate; difunctional monomers such as 1,6-hexanediol diacrylate, 1,6-hexanediol dimethacrylate, neopentyl glycol diacrylate, polyethylene glycol diacrylate, and pentaerythritol diacrylate; and polyfunctional monomers such as trimethylol propane triacrylate, trimethylol propane trimethacrylate, pentaerythritol triacrylate, and dipentaerythritol hexaacrylate.

Examples of the photopolymerization initiator include acetophenones such as 2,2-dimethoxy-2-phenyl acetophenone; butyrophenone such as α-hydroxyisobutyrophenone and p-isopropyl-α-hydroxyisobutyrophenone; halogenated acetophenones such as p-tert-butyl dichloroacetophenone, p-tert-butyl trichloroacetophenone, and α,α-dichloro-4-phenoxyacetophenone; benzophenones such as benzophenone, N,N-tetraethyl-4,4-diaminobenzophenoine; benzyls such as benzyl, benzylmethylmethylketal; benzoins such as benzoin, benzoin alkyl ether; oximes such as 1-phenyl-1,2-propanediol-2-(o-ethoxycarbonyl)oxime; xanthones such as 2-methylthioxanthone and 2-chlorothioxanthone; and radial generating compounds such as Michler's ketone and benzylmethylketal.

If required, a compound such as an amine may be added for preventing curing inhibition by oxygen, or a solvent component may be added for facilitating coating. Examples of the solvent component include, but are not limited to various organic solvents such as propylene glycol monomethyl ether acetate, methoxymethyl propionate, ethoxyethyl propionate, ethyl lactate, ethyl pyruvate, and methyl amyl ketone. As the fluid material sol-gel glass, a resin fine powder, a metal fine powder, a glass material fine powder, a ceramic fine powder, a fine mineral, or a resin material containing such a powder material may be used in the same formation method.

In addition, the light-shielding portion 203a is provided on the filler 212 of the prism elements 211. In other words, the light-shielding portion 203a is held by the filler 212. The light-shielding portion 203a is provided to overlap the filler 212 in a plan view. Specifically, the apex C1 of the isosceles triangle substantially corresponds to the central position C2 of the light-shielding portion 203a, and the length W1 (the bottom area in a two-dimensional view) of the base of the isosceles triangle is substantially the same (size) as the length W2 (the area in a two-dimensional view) of at least the light-shielding portion 203a. Therefore, incident light is completely reflected toward the apertures 203b. Further, it may be possible to effectively use regions near the light-shielding portion 203a, which do not contribute to modulation of incident light.

Figure 4B:
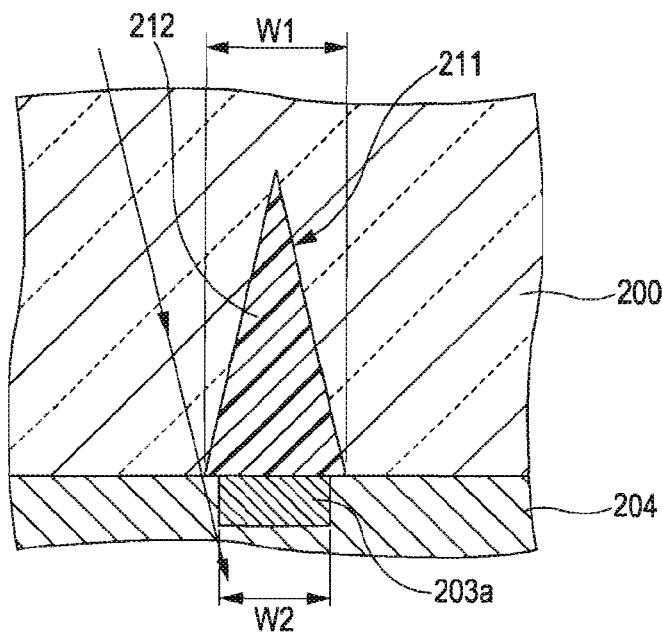

For example, as shown in FIG. 4B, when the length W1 (area) of the base of the isosceles triangle is larger than the length W2 (area) of the light-shielding portion 203a, a margin region may be secured for preventing incidence of light, which is incident on the liquid crystal panel 120R in a oblique direction, on the light-shielding portion 203a. Alternatively, the direction or angle of the inclined surface 211a may be appropriately determined.

Next, the operation of the prism elements 211 will be described with reference to FIG. 5. FIG. 5 is a schematic view showing the optical paths of light beams L1 and L2 incident on the liquid crystal panel 120R. The light beams are reflected or refracted at an interface having a refractive index difference. FIG. 5 shows an optical path in which a light beam travels straight at an interface with a small refractive index difference for the sake of simple description.

First, the light beam L1 incident directly on the apertures 203b without passing through the prism element 211 will be described. The light beam L1 traveling in air is incident on the counter substrate 200 composed of quartz glass from the incidence surface 200. Then, the light beam L1 is transmitted through the counter substrate 200 and then transmitted through the common electrode 904, the liquid crystal layer 205, and the TFT substrate 206 from the apertures 203b. The light beam L1 modulated according to an image signal is transmitted through the adhesive layer 207 and emitted from the TFT array substrate 208. Since the emission angle θ3 of the light beam L1 is smaller than the maximum angle θ4 determined by NA of the projection lens 114, the light beam L1 is projected on the screen 116 not shown in the drawing.

Next, the light beam L2 incident at a position different from the light beam L1 will be described. The light beam L2 is incident on the incidence surface 200a of the counter substrate 200. The light beam L2 traveling in the counter substrate 200 is incident at position P1 of the inclined surface 211a of the prism element 211. The prism element includes a member having a lower refractive index than that of the counter substrate 200. In order to decrease a quantity loss of light in reflection, the prism elements 211 preferably have such a refractive index that the incident light beam L2 is completely reflected toward the apertures 203a corresponding to the pixel region. The reflection and the constituent member of the prism elements 211 will be descried in detail below with reference to FIG. 6.

The light beam L2 is completely reflected by the prism elements 211 so that the optical path thereof is deflected to the apertures 203b. The light beam L2 reflected by the inclined surfaces 211a is incident on the apertures 203b. The light beam L2 incident on the apertures 203b travels in the same manner as the light beam L1 and is then emitted from the TFT array substrate 208.

(Reflection Angle and Emission Angle)

Next, the incidence angle, reflection angle, and emission angle of the light beam L2 will be described with reference to FIG. 5. The counter substrate 200 is a parallel flat plate having the incidence surface 200a and the emission surface 200b. An incidence angle θ1 is an angle formed by the light beam L2 and a normal line N1 passing through the position P1 and perpendicular to the incidence surface 200a or the emission surface 200b. The inclined surface 211a of the prism element 211 is formed at an inclination angle α with the emission surface 200b of the counter substrate 200. Furthers an emission angle θ2 is an angle of the light beam L2 emitted from the TFT array substrate 208 after traveling in the liquid crystal panel 120R.

In FIG. 5, the light beam L2 is refracted at the position P2 on the liquid crystal layer 205 and the position P3 on the pixel electrode 206a due to a refractive index difference at an interface. In the description of the incidence angle θ1 and the emission angle θ2 of the light beam L2, the light beam L2 is regarded as traveling straight without being refracted at the positions P2 and P3 for the sake of simplicity. Under this condition, the following expression (1) is established:

$$\alpha = (1/2) \cdot (\theta 2 - \theta 1) \quad (1)$$

As seen from the expression (1), the incidence angle θ1 of the light beam L2 can be appropriately converted to the emission angle θ2 by appropriately setting the inclination angle α of the inclined surface 211a. When the emission angle θ2 of the light beam L2 is smaller the maximum angle θ4 determined by the NA of the projection lens 114, the light beam L2 is projected on the screen 116 not show in the drawing.

As described above, the light beams L1 and L2 at different incidence angles are incident on the apertures 203b from, for example, the extra-high pressure mercury lamp 101 serving as a light source. The light beam L1 incident on the apertures 203b without passing through the prism element 211 is directly modulated according to an image signal and emitted from the TFT array substrate 208.

On the other hand, the light beam L2 incident on the light shielding portion 203a provided in a non-modulation region in the periphery of the apertures 203b is incident on the prism element 211 serving as an optical path deflecting portion provided in the periphery of the apertures 203a. The light beam L2 incident on the prism element 211 is reflected toward the apertures 203a. Therefore, the optical path of the light beam L2 which is basically not incident on the apertures 203a is deflected by reflection so that the light beam L2 is efficiently guided to the apertures 203a.

Furthermore, the light beam L1 is emitted from the liquid crystal panel 120R without a significant change in the optical path. In addition, unlike a micro-lens, the prism element 211 has no light condensing function. Therefore, the emission angle θ2 of the light beam L2 reflected by the prism element 211 is not so different from the incident angle θ1. For example, when substantially parallel light is incident on the liquid crystal panel 120R, therefore, modulated light is emitted as substantially parallel light.

The substantially parallel emitted light is projected on the screen 116 without being reflected by the projection lens 114. In accordance with this embodiment, it may be possible to efficiently guide the light beams L1 and L2 to the apertures 203b and decrease increases in the angles of the light beams L1 and L2 emitted from the first color light spatial light modulator 110R with respect to the optical axis. Therefore, light emitted from the liquid crystal panel 120R is not reflected by the projection lens 114, thereby exhibiting the effect of forming a bright projected image.

When incident light condenses in the liquid crystal layer 205, liquid crystal molecules may be degraded by energy concentration. In this embodiment, a lens component like a microbes is not provided, and thus light incident on the alignment film 206c is not condensed. Therefore, incident light is substantially uniformly incident on the alignment film 206c, which constitutes a light modulation element, without being condensed in a portion thereof, and thus the above-described energy concentration may be avoided. As a result, the life of the alignment film 206c is increased, and thus the life of the liquid crystal panel 120R is also increased.

Figure 6:
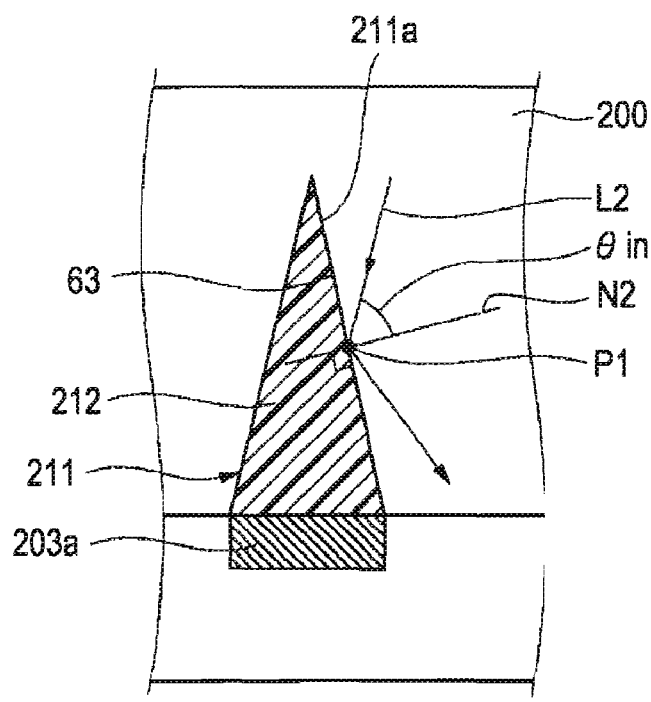
FIG. 6 is a drawing illustrating the operation of a prism element.

Next, the configuration and reflection operation of the prism element 211 will be described in further detail below with reference to FIG. 6. As described above, light is reflected at the inclined surface 211a in the direction L2 by Fresnel reflection due to a difference in refractive index between the counter substrate 200 and the prism element 211. Further, in order to decrease a quantity loss of light due to reflection, the light beam L2 is preferably completely reflected. In order to completely reflect the light beam, it may be necessary to satisfy a condition represented by the expression (2) below.

Furthermore, the relation between incidence angles θin and θ1 will be described. These incidence angles have the relationship, θin=90°−θ1−α, to the angle α formed by the inclined surface 211a and the normal N1 to the emission surface 200b. When the incident angle θ1 is 12° and the inclination angle α is 0.5°, the incidence angle θin is 77.5° These parameters are substituted into the expression (2).

$$\sin \theta in = n2/n1 (n1 > n2) \quad (2)$$

wherein θin is the incidence angle with the normal line N2 at the position P1, n1 is the refractive index of the counter substrate 200, and n2 is the refractive index of the prism element 211. For example, when the incidence angle θin defined in FIG. 6 is 12°, i.e., θ1 is 77.5°, the refractive index n1 is 1.46 (quartz) and the refractive index n2 is 1.42 in order to achieve total reflection.

(Manufacturing Method)

Figure 7A:
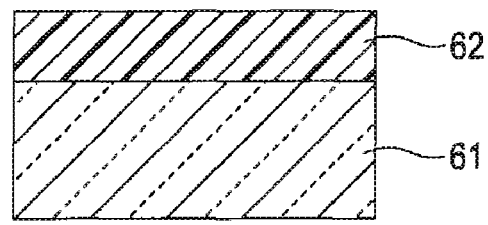
FIGS. 7A, 7B, and 7C are sectional views illustrating respective steps of a method for manufacturing a liquid crystal panel.
Figure 7B:
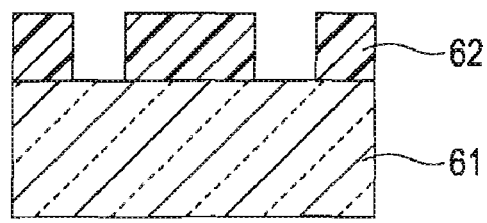
Figure 7C:
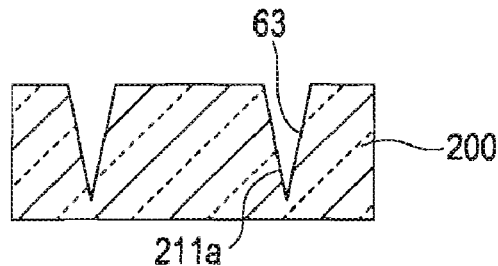

Next, description will be made of the procedures for forming the prism elements 211 and the light-shielding portion 203a in the counter substrate 200 of the liquid crystal panel 120R having the above-described configuration. FIGS. 7A to 7C show the procedures for forming the grooves of the prism elements 212, and FIGS. 8 to 11 show the procedures for filling grooves of the prism elements 211 with the filler 212.

The prism elements 211 may be formed by a laser application process or a dry etching process. In the laser application process, prism elements are formed by irradiating a transparent substrate with $CO_2$ laser on the basis of previously determined data. The procedures shown in FIGS. 7A to 7C are adapted for forming the prism elements 211 by the dray etching process using a thick resist film.

First, as shown in FIG. 7A, a resin resist layer 62 is formed on a substrate 61. As the substrate 61, a glass substrate or a transparent resin substrate may be used. The resin resist layer 62 serves as a mask layer and is deposited to a thickness of, for example, 50 μm to 200 μm. As the resin resist layer 62, for example, SU-8 or KMPR (both trade names of Microchem Corp.) may be used. Next, as show in FIG. 7B, the resin resist layer 62 is patterned to remove the resin resist layer 62 from portions where the prism elements to be formed. After the patterning, baking is performed at a temperature of about 100° C. for about 60 minutes.

Next, dry etching is performed using the patterned resin resist layer 62 as a hard mask. In the dry etching, for example, an ICP dry etching apparatus capable of forming high-density plasma is used. As shown in FIG. 7C, grooves 63 having an isosceles angular section are formed in the substrate 61 by the dry etching. As an etching gas for uniformly forming high-density plasma in an etching area, for example, a fluoride gas such as $C_4F_8$ or $CHF_3$ is preferably used. Also, the inclination angle of the grooves 63 is set to be a desired value by setting the temperature of the counter substrate 200 during etching.

For example, when the etching selection ratio between the materials of the substrate 61 and the resin resist layer 62 is 4:1, the grooves 63 having a depth of about 4 times the thickness of the resin resist layer 62 are formed in the substrate 61. In order to prevent carbonization of the resist in an etching environment, the substrate 61 may be cooled with a chiller or a cooling time may be provided between etching cycles. The dry etching process using SU-8 is described in, for example, Takayuki Fukasawa et al., "Deep Dry Etching of Quartz Plate Over 100 μm in Depth Employing Ultra-Thick Photoresist (SU-8)" (Japanese Journal of Applied Physics, Vol. 42 (2003), pp. 3702-3706, The Japan Society of Applied Physics. The walls of the grooves 63 formed as described above are the inclined surfaces 211a of the prism elements 21.

Next, the procedures for filling the groves 63 of the prism elements 211 with the filler 212 will be described with reference to FIGS. 8 to 11. In this embodiment, the filling procedures using a resin material (e.g., acrylic resin or the like) which is cured by ultraviolet rays are described.

Figure 8:
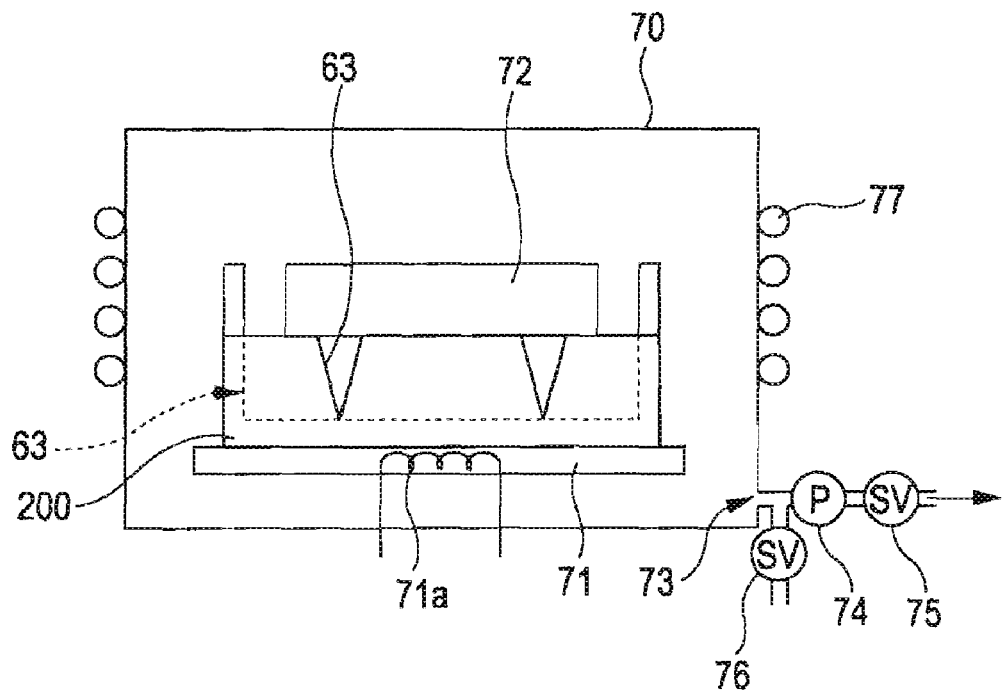
FIG. 8 is a sectional view illustrating a step of a method for manufacturing a liquid crystal panel.

First, as shown in FIG. 8, the counter substrate 200 provided with the grooves 63 is placed on a pedestal 71 of a vacuum chamber 70, and a filling mold 72 is placed on the counter substrate 200. In this state, a pump 74 provided at a vent 73 of the vacuum chamber 70 is driven, and at valve 75 is opened to reduce the internal pressure in the vacuum chamber 70 to about 18 Pa or less. At this time, a valve 76 is closed.

Figure 9:
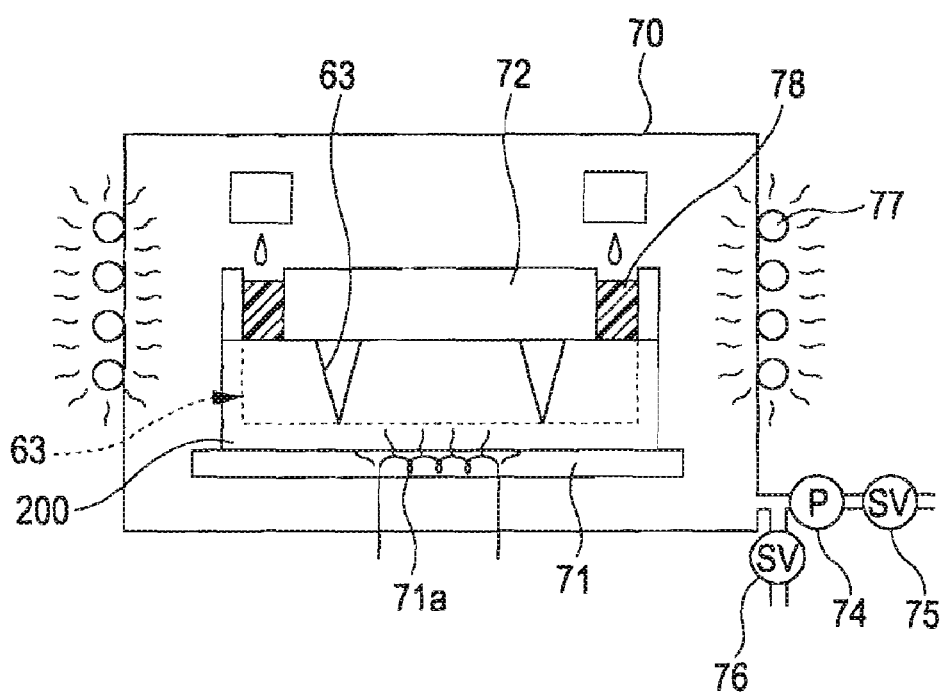
FIG. 9 is a sectional view illustrating a step of a method for manufacturing a liquid crystal panel.

Next, as shovel in FIG. 9, a heater 77 is operated to heat the inside of the vacuum chamber 70 to about 60° C. and pour, into the filling mold 72, a resin material 78 such as an acrylic resin or the like which has been previously softened by heating to a softening temperature. At the same time, a heating mechanism 71a such as a heating wire provided in the pedestal 71 is operated to heat, through the pedestal 71, the counter substrate 200 to about 60° C. substantially the same temperature as in the chamber 70.

Figure 10:
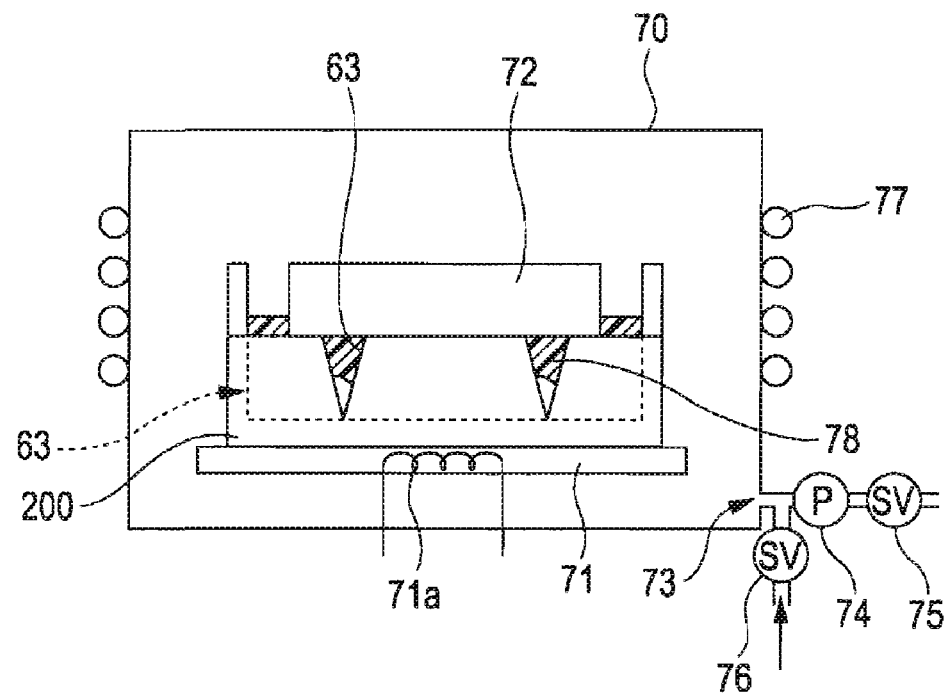
FIG. 10 is a sectional view illustrating a step of a method for manufacturing a liquid crystal panel.

Next, as shown in FIG. 10, the valve 76 is opened to increase the pressure in the vacuum chanter 70 to about 600 Pa, and the vacuum chamber 70 is opened to air. As a result, the atmospheric pressure is applied to the upper surface of the resin material 78 shown in the drawing, and the resin material 78 is poured into the grooves 63 formed in the counter substrate 200 by the pressure. After the resin material 78 is poured into the grooves 63, the resin material 78 spreads along the grooves 63 due to a capillary phenomenon. By using such a fluid material, the grooves are easily filled with the material.

Figure 11:
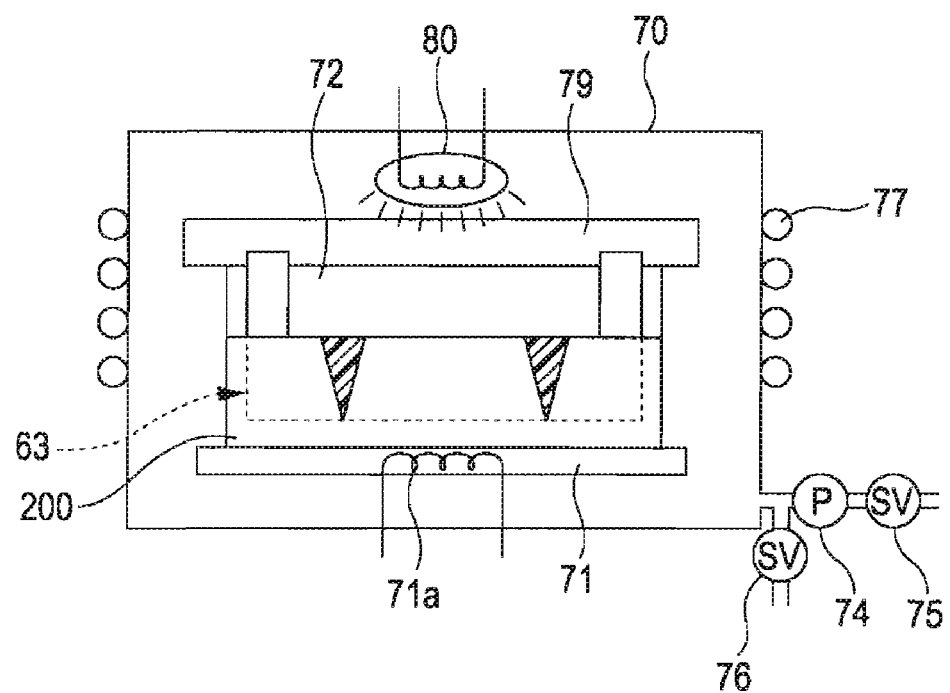
FIG. 11 is a sectional view illustrating a step of a method for manufacturing a liquid crystal panel.

Next, as shown in FIG. 11, a pressure plate 79 made of a transparent material such as quartz is placed on the filling mold 72 so that the counter substrate 200 is pressed by the filling mold 72. By pressing the counter substrate 200 by the filling mold 72, the surface of the resin material 78 is prevented from projecting from the grooves 63 due to surface tension. In this state, an ultraviolet lamp 80 is lighted to cure the resin material 78. The resin material 78 is cured to form the filler 212. Then, the filling mold 71 is separated from the counter substrate 200.

After the grooves 63 of the counter substrate 200 are filled with the filler 212, the light-shielding portion 203a composed of, for example, a metal material such as Cr or Al, or a black resin, is formed on the filler 212. As a method for forming the light-shielding portion 203a, a known deposition method such as a sputtering method, a CVD method, or the like may be used.

Then, the common electrode 204 and the alignment film 204c are formed to prepare the counter substrate 200. Then, the counter substrate 200 is bonded to the TFT array substrate 208A separately formed, and the liquid crystal layer 205 is sealed between both substrates to manufacture the liquid crystal panel 120R.

In accordance with this embodiment, the filler 212 is provided to fill in the grooves 63 constituting the prism elements 211. Therefore, when the light-shielding portion 203a is disposed on the surface of the counter substrate 200 provided with the prism elements 211, the light-shielding portion 203a is supported by the filler 212 serving as a bed. Since the filler 212 supports the light-shielding portion 203a, a cover glass need not be provided on the surface of the counter substrate 200, thereby achieving the low-coat thin liquid crystal panel 120R having excellent light utilization efficiency.

Second Embodiment

Next, a second embodiment of the invention will be described. This embodiment is different from the first embodiment in material and composition of a filler formed in grooves of prism elements and manufacturing method. Therefore, these points are mainly described.

(Prism Element)

Figure 12:
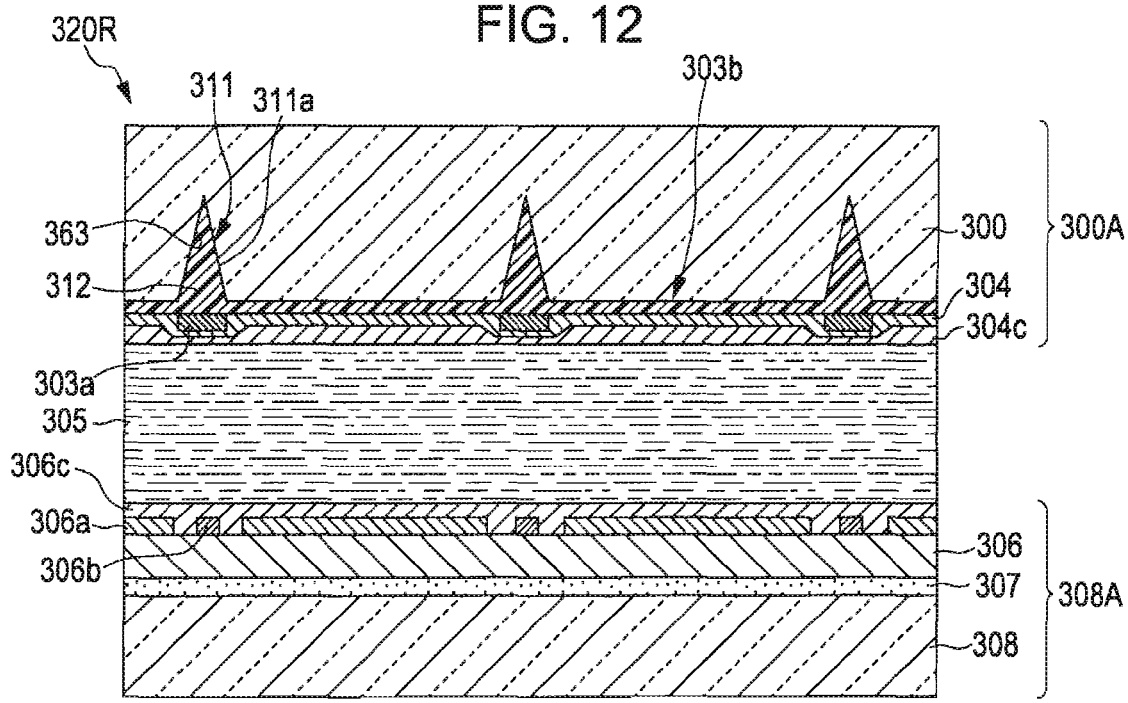
FIG. 12 a partial sectional view showing the configuration of a liquid crystal panel according to a second embodiment of the invention.

FIG. 12 is a sectional view showing the configuration of a liquid crystal panel 320R.

Each of prism elements 311 serves as an optical path deflecting portion having a groove 363 formed to extend inward from the inner surface of a counter substrate 300. The groove 63 is provided with a filter 312 composed of an inorganic material such as sol-gel glass or silicon as a raw material. The prism elements 311 have an isosceles triangular section. A filler 312 composed of an inorganic material such as sol-gel glass or silicon as a raw material is formed in the grooves 363. The filler 312 is formed in the grooves 363 of the prism elements 311 so as to cover the inner surface of the counter substrate 300.

The refractive index of the sol-gel glass constituting the filler 319 is lower than that of the counter substrate 300. Therefore, light transmitted through the counter substrate 300 is completely reflected by inclined surfaces 311a forming the oblique sides of the isosceles triangular section. The other configuration is the same as in the first embodiment.

(Manufacturing Method)

Figure 13:
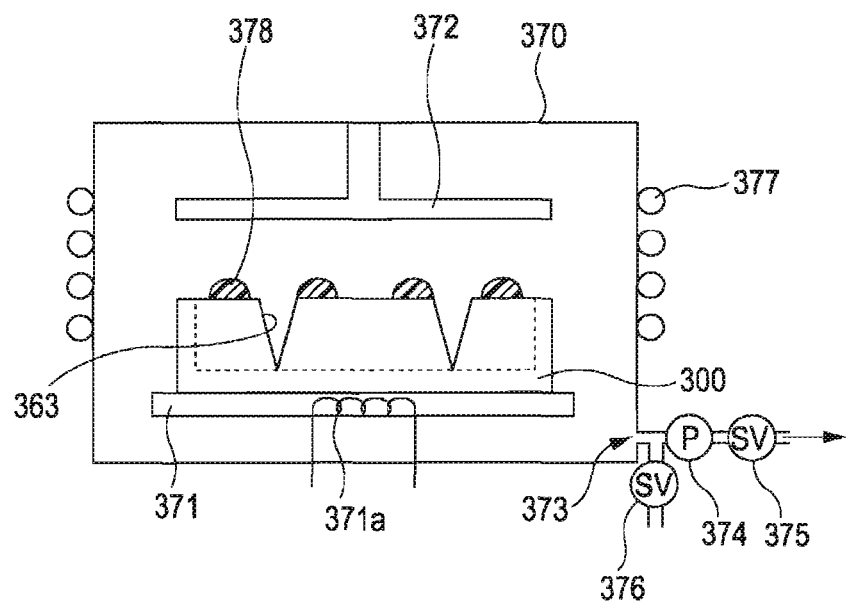
FIG. 13 is a sectional view illustrating a step of a method for manufacturing a liquid crystal panel.
Figure 14:
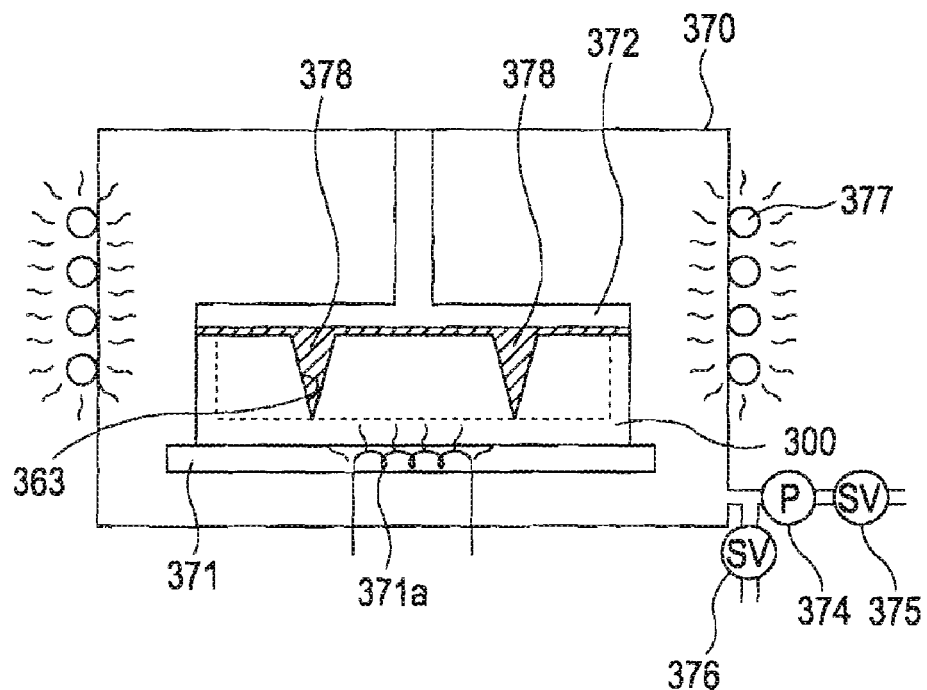
FIG. 14 is a sectional view illustrating a step of a method for manufacturing a liquid crystal panel.
Figure 15:
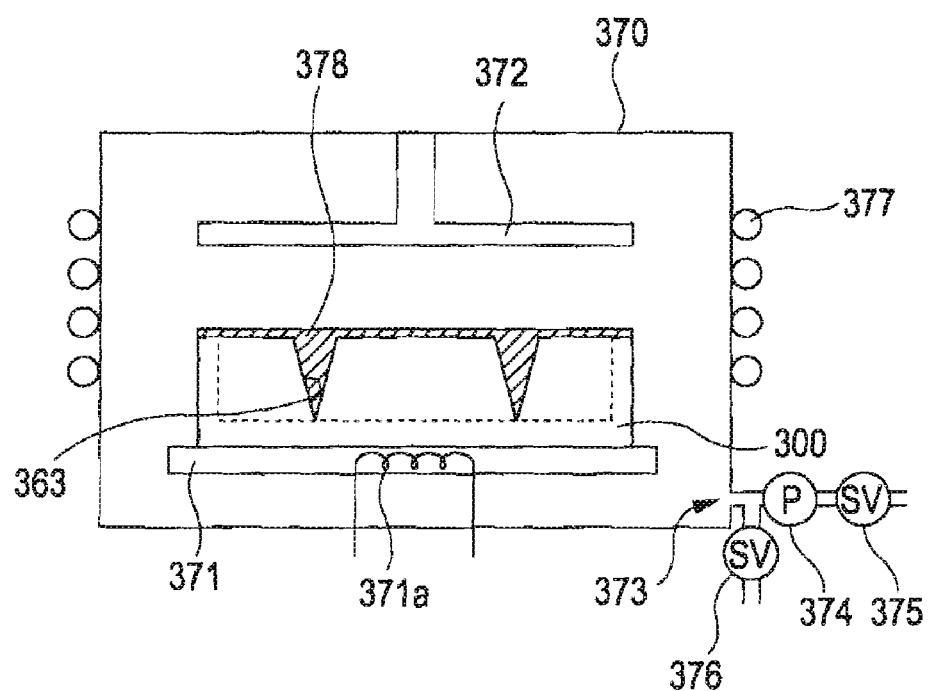
FIG. 15 is a sectional view illustrating a step of a method for manufacturing a liquid crystal panel.

Next, the procedures for forming the prism elements 311 in the counter substrate 300 of the liquid crystal panel 320R having the above-described configuration will be described with reference to FIGS. 13 to 15. FIGS. 13 to 15 show the procedures for filling the grooves of the prism elements 311 with the filler 312. Since the procedures for forming the grooves of the prism elements 311 are the same as in the first embodiment, the description thereof is omitted.

First, as shown in FIG. 13, the counter substrate 300 provided with the grooves 363 is placed on a pedestal 371 of a vacuum chamber 370, fluid sol-gel glass 378 is added dropwise onto the counter substrate 300 by, for example, an ink-jet method. In this state, a pump 374 provided at a vent 373 of the vacuum chamber 370 is driven, and a valve 375 is opened to reduce the internal pressure in the vacuum chamber 370 to about 60 Pa or less. At this time, a valve 376 is closed.

Next, as shown in FIG. 14, a heater 377 is operated to heat the inside of the vacuum chamber 370 to about 60° C. and, at the same time, a heating mechanism 371a such as a heating wire provided in the pedestal 371 is operated to heat the counter substrate 300 through the pedestal 371. In this state, a press plate 372 is lowered to the vicinity of the counter substrate 300 to press the fluid sol-gel glass 378 and spread it over the entire surface of the counter substrate 300. At this time, the grooves 363 are filled with the spreading fluid sol-gel glass 378.

Next, as shown in FIG. 15, the press plate 372 is moved upward. In this state, the valve 376 is opened to increase the pressure in the vacuum chamber 370 to about 600 Pa, and the vacuum chamber 370 is opened to air. As a result, the atmospheric pressure is applied to the upper surface of the fluid sol-gel glass 378 shown in the drawing, and the fluid sol-gel glass 378 is diffused to the tips of the grooves 363 formed in the counter substrate 300 by the pressure.

Next, the fluid sol-gel glass 378 diffused into the grooves 363 formed in the counter substrate 300 is solidified by burning. When the sol-gel glass 378 is solidified to form the filler 312. Then, a light-shielding portion 303a composed of, for example, a metal material such as Cr or Al, or a black resin, is formed on the filler 312.

After the light-shielding portion is formed, a common electrode 304 and an alignment film 304c are formed to prepare the counter substrate 300 by the same method as in the first embodiment. Then, the counter substrate 300 is bonded to a TFT array substrate 308A separately formed, and a liquid crystal layer is sealed between both substrates to manufacture the liquid crystal panel 320R.

In accordance with this embodiment, the fluid sol gel glass is solidified by heating to form the filler 312. Therefore, it may be possible to manufacture a liquid crystal panel 320 without using a large-scale apparatus.

Third Embodiment

A third embodiment of the invention will be described. This embodiment is different from the first embodiment in configuration of a filler formed in grooves of prism elements and a light-shielding portion, and thus this point is mainly described.

Figure 16:
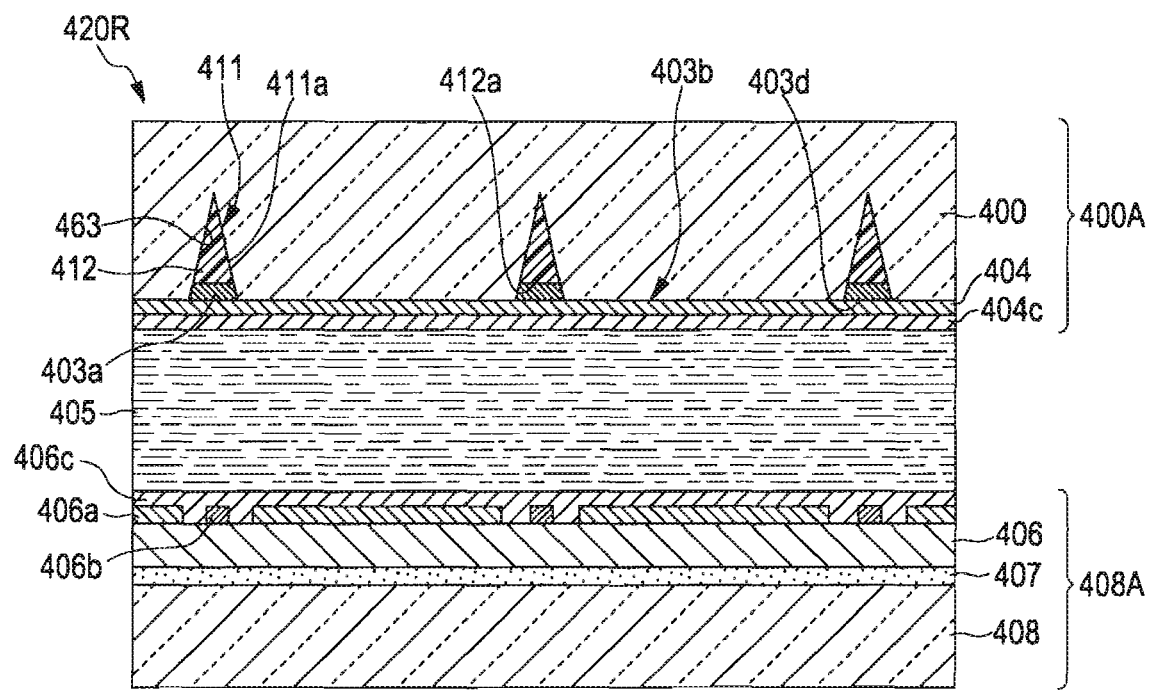
FIG. 16 a partial sectional view showing the configuration of a liquid crystal panel according to a third embodiment of the invention.

FIG. 16 is a sectional view showing the configuration of a liquid crystal panel 420R.

Each of prism elements 411 serves as an optical path deflecting portion having a groove 463 formed to extend inward from the inner surface of a counter substrate 400. Like in the first embodiment, the groove 463 is provided with a filler 412 composed of, for example, an acrylic resin as a raw material. The prism elements 411 have an isosceles triangular section. The filler 412 is formed to fill in the grooves 463 of the prism elements 411 so that the surface 412a of the filler 412 is positioned deeper than the inner surface of the counter substrate 400.

A light-shield portion 403a is formed on the surface 412a of the filler 412 to fill in the remaining portions of the grooves 463. Namely, the filler 412 and the light-shielding portion 403a are formed in each groove 463. In addition, the surface 403d of the light-shielding portion 403a is flush with the counter substrate 400. The light-shielding portion 403a is formed over the entire surface of the counter substrate 400 provided with the filler 412 by a CVD method or the like and then patterned by photolithography. The other configuration is the same as in the first embodiment.

In accordance with this embodiment, the surface 403d of the light-shielding portion 403a is flush with the inner surface of the counter substrate 400, and thus the light-shielding portion 403a does not project from the inner surface of the counter substrate 400. Therefore, the quantity of light absorbed by the light-shielding portion 403a is smaller than that of the case in which the light-shielding portion 403a is formed on the inner surface of the counter substrate 400. Thus, it may be possible to effectively utilize light.

Fourth Embodiment

Figure 17:
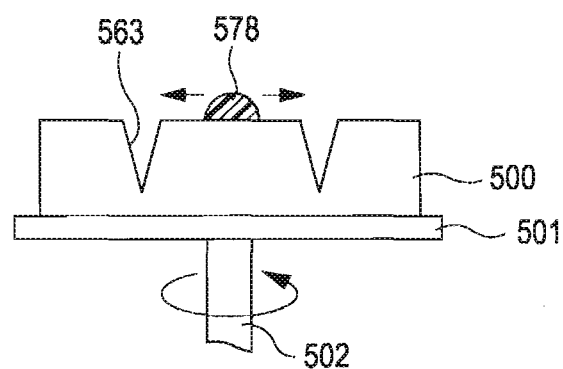
FIG. 17 is a sectional view illustrating a step for manufacturing a liquid crystal panel according to a fourth embodiment of the invention.
Figure 18:
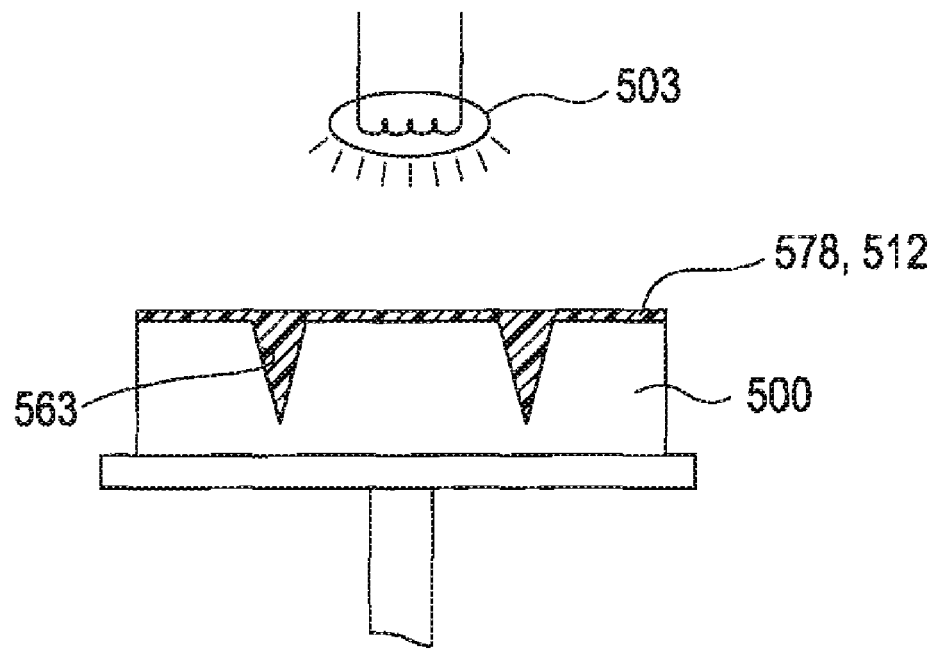
FIG. 18 is a sectional view illustrating a step for manufacturing the liquid crystal panel shown in FIG. 17.
Figure 19:
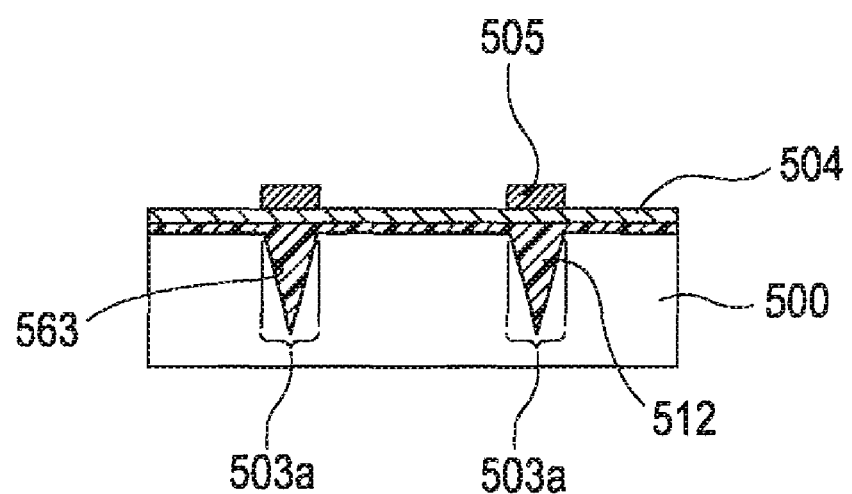
FIG. 19 is a sectional view illustrating a step for manufacturing the liquid crystal panel shown in FIG. 17.

Next, a fourth embodiment of the invention will be described with reference to FIGS. 17 to 19. This embodiment is different from the first embodiment in that a filler is formed in grooves of prism elements by spin coating. Therefore, this point is mainly described. FIGS. 17 to 19 are views showing respective steps for filling the grooves of prism elements with the filler.

First, as shown in FIG. 17, a counter substrate 500 provided with grooves 563 is placed on a pedestal 501, and a fluid acrylic resin material 578 is disposed on the surface of the counter substrate 500. In this state, a rotational shaft 502 is rotated to rotate the pedestal 501 and spread the acrylic resin material 578 on the counter substrate 500 over the entire surface thereof due to the centrifugal force of rotation.

Next, as shown in FIG. 18, the acrylic resin material 578 formed in the grooves 563 and on the surface of the counter substrate 500 is irradiated with ultraviolet rays using an ultraviolet lamp 503. In this step, the acrylic resin material 578 is cured. The cured acrylic resin material 578 forms the filler 512.

Next, as shown in FIG. 19, a metal material 504 such as Cu or the like is deposited over the entire surface of the filler 512 by a CVD method or sputtering method and then patterned by photolithography to form a light-shielding portion 503a. Specifically, a resist layer 505 is formed on the Cu film 504 and along the grooves 563, followed by exposure and development with a developer to form the light-shielding portion 503a.

In accordance with this embodiment, the filler 512 is filled in the prism elements 511 by spin coating. Although, in this embodiment, the method of filling the filler 512 by spin coating is described, the method is not limited to this. For example, the filler 512 may be filled by spray coating or heat pressing.

Fifth Embodiment

Next, a fifth embodiment of the invention will be described. This embodiment is different from the first embodiment in configuration of a filler formed in prism elements. Therefore, this point is mainly described.

Figure 20:
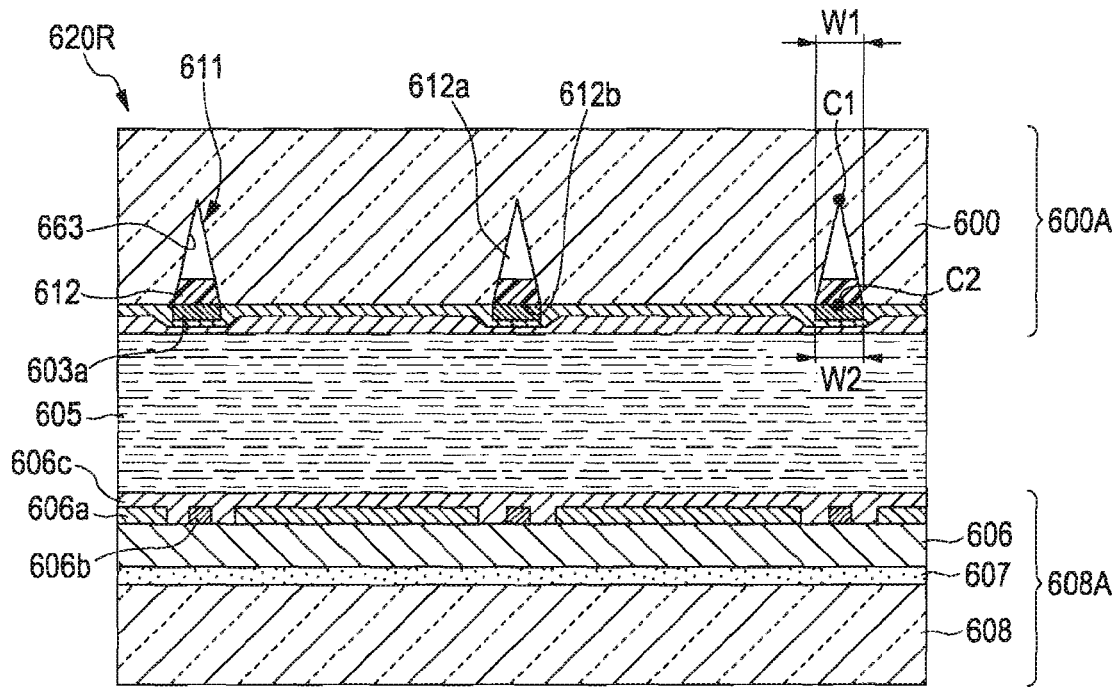
FIG. 20 a partial sectional view showing the configuration of a liquid crystal panel according to a fifth embodiment of the invention.

FIG. 20 is a sectional view showing the configuration of a liquid crystal panel 620R.

Each of prism elements 611 serves as an optical path deflecting portion having a groove 663 formed to extend inward from the inner surface of a counter substrate 600. Like in the first embodiment, the groove 663 is provided with a filter 612 composed of, for example, an acrylic resin as a raw material. In this embodiment, the filler 612 is formed to have hollow portions 612a on the tip side of the prism elements 611 formed in the counter substrate 600. The hollow portions 612a are closed by the grooves 663 and the filler 612. The hollow portions 612a may be evacuated or air or nitrogen gas may be sealed therein. The surface 612b of the filler 612 is flush with the inner surface of the counter substrate 600.

A light-shielding portion 603a is provided in a lattice formed on the filler 612 and along the filler 612. In other words, the light-shielding portion 603a is provided to overlap the filler 612 in a plan view. Specifically, like in the first embodiment, the apex C1 of an isosceles triangle substantially corresponds to the central position C2 of the light-shielding portion 603a, and the length W1 (bottom area in a two-dimensional view) of the base of an isosceles triangle is substantially the same (size) as the length W2 (area in a two-dimensional view) of at least the light-shielding portion 603a. Therefore, incident light is reflected to apertures 603b. In addition, regions near the light-shielding portion 603a, which do not contribute to modulation of incident light, are effectively utilized. The other configuration is the same as in the first embodiment.

(Manufacturing Method)

Next, the procedures for forming the prism elements 611 in the counter substrate 600 of the liquid crystal panel 620R having the above-described configuration will be described. Since the procedures for forming the grooves of the prism elements 611 is the same as in the first embodiment, the description thereof is omitted. FIGS. 21 to 24 show the procedures for filling the grooves of the prism elements 611 with the filler 612.

In this embodiment, the filling procedures using a resin material (e.g., an acrylic resin) that is cured by ultraviolet rays are described.

Figure 21:
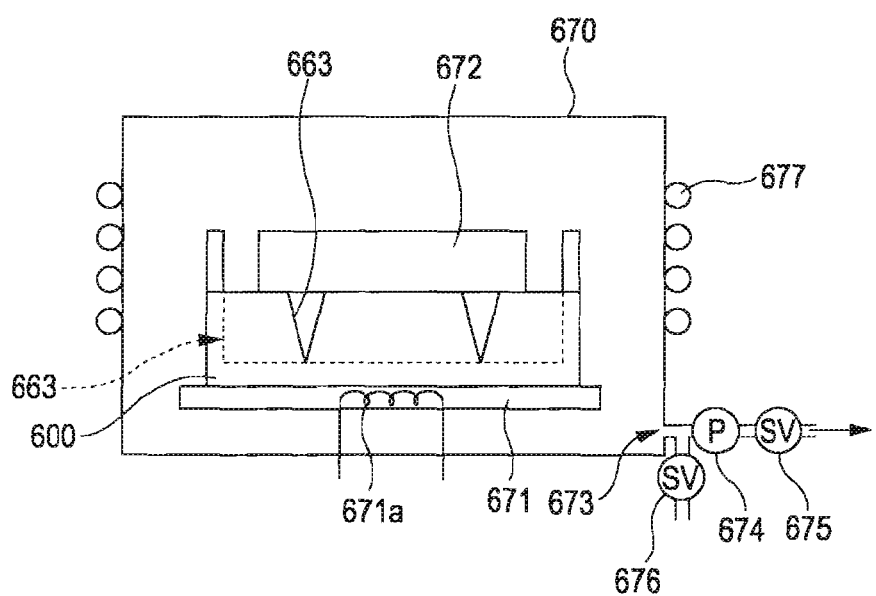
FIG. 21 is a sectional view illustrating a step for manufacturing the liquid crystal panel shown in FIG. 20.

First, as shown in FIG. 21, the counter substrate 600 provided with the grooves 663 is placed on a pedestal 671 of a vacuum chamber 670, and a filling mold 672 is placed on the counter substrate 600. In this state, a pump 674 provided at a vent 673 of the vacuum chamber 670 is driven, and a valve 675 is opened to reduce the internal pressure in the vacuum chamber 670 to about 60 Pa or less. At this time, a valve 676 is closed.

Figure 22:
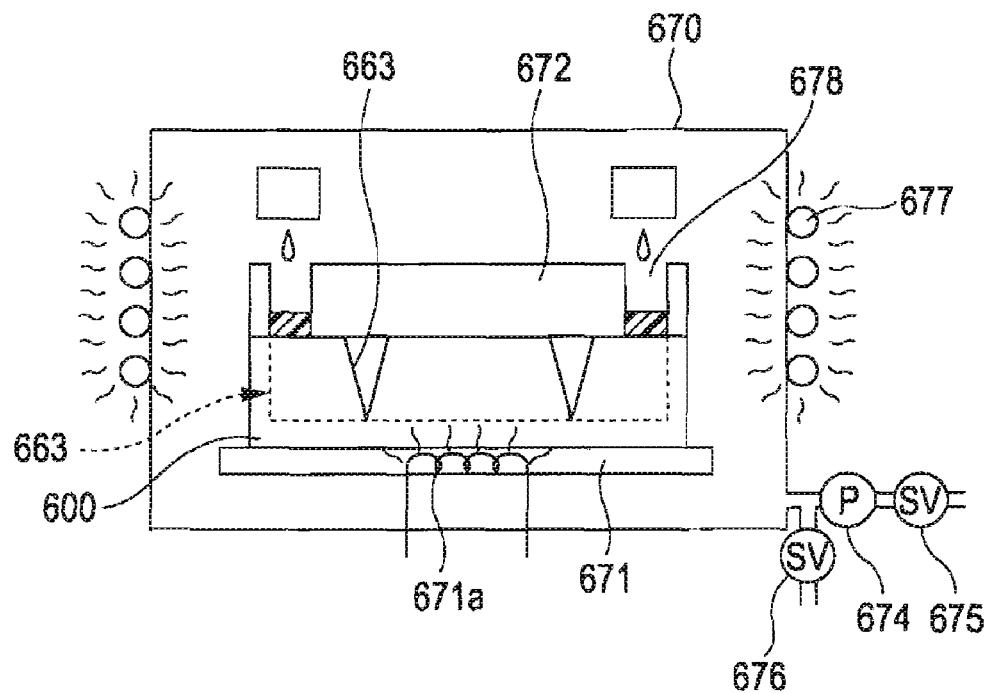
FIG. 22 is a sectional view illustrating a step for manufacturing the liquid crystal panel shown in FIG. 20.

Next, as shown in FIG. 22, a heater 677 is operated to heat the inside of the vacuum chamber 670 to about 50° C. and pour, into the filling mold 672, a resin material 678 such as an acrylic resin or the like which has been previously softened by heating to a softening temperature. The amount of the resin material 678 poured into the filling mold 672 is smaller than in the first embodiment. At the same time, a heating mechanism 671a such as a heating wire provided in the pedestal 671 is operated to heat the counter substrate 600 to about 50° C. through the pedestal 671.

Figure 23:
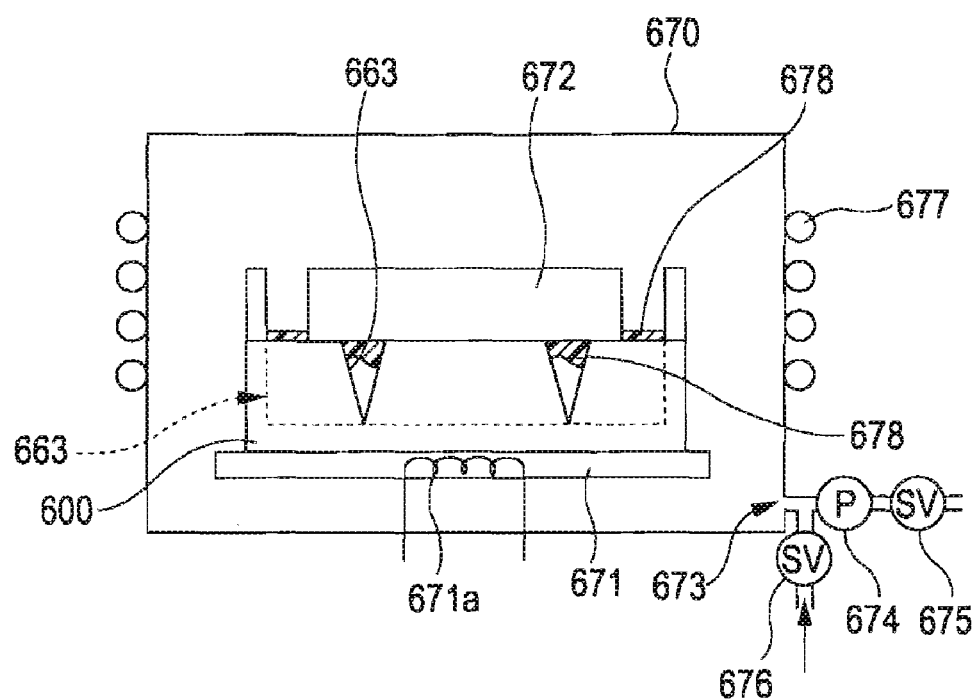
FIG. 23 is a sectional view illustrating a step for manufacturing the liquid crystal panel shown in FIG. 20.

Next, as shown in FIG. 23, the valve 676 is opened to increase the pressure in the vacuum chamber 670 to about 600 Pa, and the vacuum chamber 670 is opened to air. As a result, the atmospheric pressure is applied to the upper surface of the resin material 678 shown in the drawing, and the resin material 678 is poured into the grooves 663 formed in the counter substrate 600 by the pressure. After the resin material 678 is poured into the grooves 663, the resin material 678 spreads along the grooves 663 due to a capillary phenomenon. The pressure in the vacuum chamber 670 in pressure reduction is higher than that in the first embodiment, and a difference from the pressure at the time of opening to air is smaller than that in the first embodiment. Therefore, the resin material 678 is filled only in openings, not spread to the tips of the grooves 663. As a result, the resin material 678 is provided to seal the hollow portions 612a at the tips of the grooves 663.

In addition, the temperature of the liquid crystal panel 620R is about 40° C. to 70° C. during use, and thus the maximum temperature difference of 50° C. from room temperature, i.e., 70° C. (maximum temperature)–20° C. (room temperature)=50° C., occurs. In order to prevent the pressure in the hollow portions 612a from being increased by the temperature difference, the hollow portions 612a are preferably sealed at a pressure of about 82.757 kPa, i.e., 101.325 (kPa)–(50/273)×101.325 (kPa)=82.757 (kPa).

Figure 24:
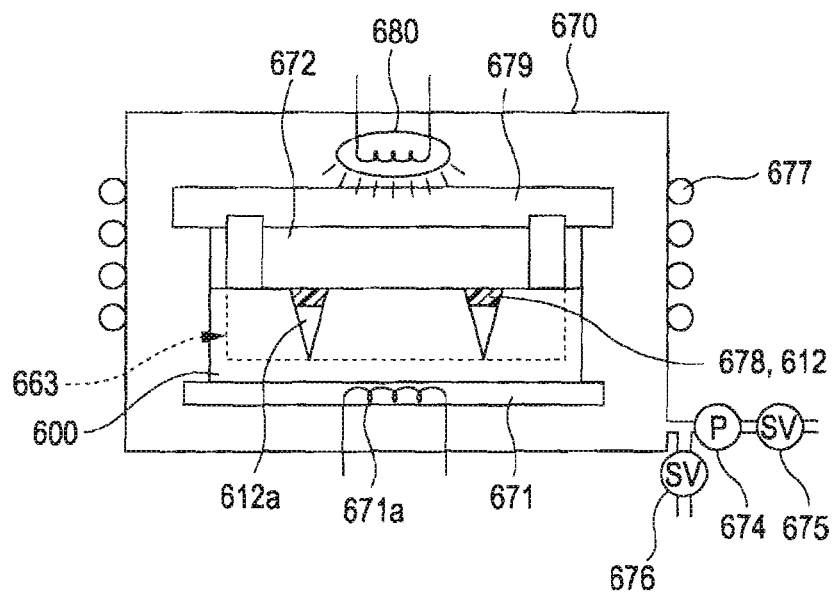
FIG. 24 is a sectional view illustrating a step for manufacturing the liquid crystal panel shown in FIG. 20.

Next, as shown in FIG. 24, a pressure plate 679 made of a transparent material such as quartz is placed on the filling mold 672 so that the counter substrate 600 is pressed by the filling mold 672. By pressing the counter substrate 600 by the filling mold 672, the surface of the resin material 678 is prevented from projecting from the grooves 663 due to surface tension. In this state, an ultraviolet lamp 680 is lighted to cure the resin material 678. The resin material 678 is cured to form the filler 612. Then, the filling mold 672 is separated from the counter substrate 600.

After the grooves 563 of the prism elements 611 are filled with the filler 612, a light-shielding portion 603a composed of, for example, a metal material such as Cr or Al, or a black resin, is formed on the filler 612. As a method for forming the light-shielding portion 603a, a known deposition method such as a sputtering method, a CVD method, or the like may be used.

Then, a common electrode 604 and an alignment film 604c are formed to prepare the counter substrate 600. Then, the counter substrate 600 is bonded to a TFT array substrate separately formed, and a liquid crystal layer is sealed between both substrates to manufacture the liquid crystal panel 620R.

In accordance with this embodiment, the grooves 663 are not completely filled with the filler 612 to provide the hollow portions 612a, thereby efficiently supporting a functional layer. In addition, in this embodiment, the follow portions 612a are provided on the inclined surface side of the grooves 663, and thus the refractive index of the hollow portions 612a is significantly lower than that of the counter substrate 600. Therefore, may be possible to securely completely reflect light transmitted through the counter substrate 600 by the inclined surfaces 611a provided with the hollow portions 612a. By securing a region capable of securely completely reflecting light, it may be possible to improve the light utilization efficiency.

In the step of filling the filler 612, the resin material 678 is poured into the grooves and cured under a pressure reduced to about 60 Pa in the vacuum chamber 670. Therefore, the prism elements 611 are formed under the condition in which the pressure in the groove hollow portions 612a is reduced. When the liquid crystal panel 620R is used as a light valve, the ambient temperature is about 40° C. to 70° C., and the temperature of the hollow potions 612a is also increased. Therefore, if the hollow portions 612a are at the atmospheric pressure, the function of the prism elements 611 may be damaged by thermal expansion of the hollow portions 612a due to a temperature rise. However, in this embodiment, the hollow portions 612a are at a reduced pressure, and thus thermal expansion is prevented, thereby avoiding deterioration in the function of the prism elements 611.

Sixth Embodiment

Next, a sixth embodiment of the invention will be described. Like in the fifth embodiment, in this embodiment, hollow portions are formed at the tips of prism elements. This embodiment is different from the fifth embodiment in configuration of a filler and a method for forming prism elements. Therefore, this point is mainly described.

Figure 25:
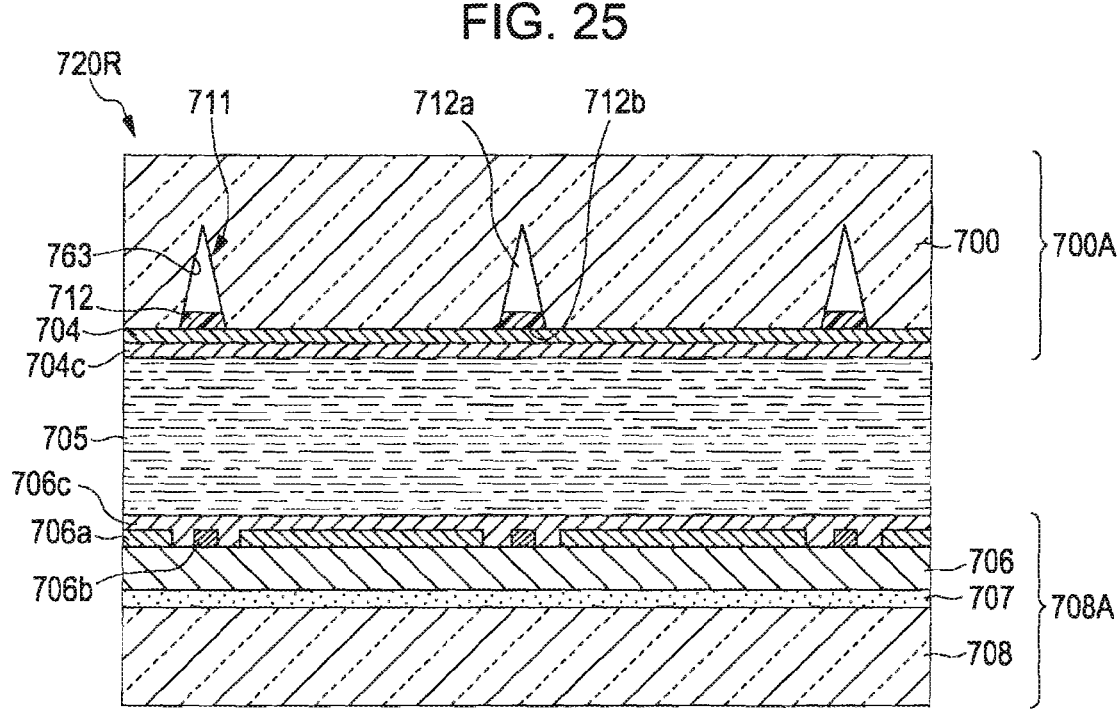
FIG. 25 a partial sectional view showing the configuration of a liquid crystal panel according to a sixth embodiment of the invention.

FIG. 25 is a sectional view showing the configuration of a liquid crystal panel 720R.

Each of prism elements 711 serves as a grooves shaped optical path deflecting portion extending inward from the inner surface of a counter substrate 700 and has an isosceles triangular section. A filler 712 composed of a metal material, e.g., Cr, is formed in the grooves. The material. For the filler 712 may be a metal material other than Cr, for example, Ni, Al, Pt, Au, Ag, Ti, Tw, or Mo, or an inorganic material such as ceramic or a mineral. When fine particles of the inorganic material or a resin containing the inorganic material is filled, planarization is facilitated, and a light-shielding function is imparted to the filler. In particular, the metal material has high thermal conductivity and is thus useful for making the temperature in the panel uniform to increase the life of the panel.

Like in the fifth embodiment, in this embodiment, the filler 712 is formed to have the hollow portions 712a at the tips of the grooves of the prism elements 711 formed in the counter substrate 700. Although FIG. 25 shows the grooves 763 with the angular tips, in fact, the width of the tips (length in the lateral direction in the drawing) of the grooves 763 is about 1.0 μm. In addition, the surface 712b of the filler 712 is flush with the inner surface of the counter substrate 700. Since the filler 712 is composed of the metal material, light is reflected by the whole surface. Namely, in this embodiment, the filler 712 also functions as a light-shielding portion. The other configuration is the same as in the fifth embodiment.

Next, the step of filling the grooves of the prism elements 711 with the filler 712 in the liquid crystal panel 720R having the above-described configuration will be described.

Figure 26:
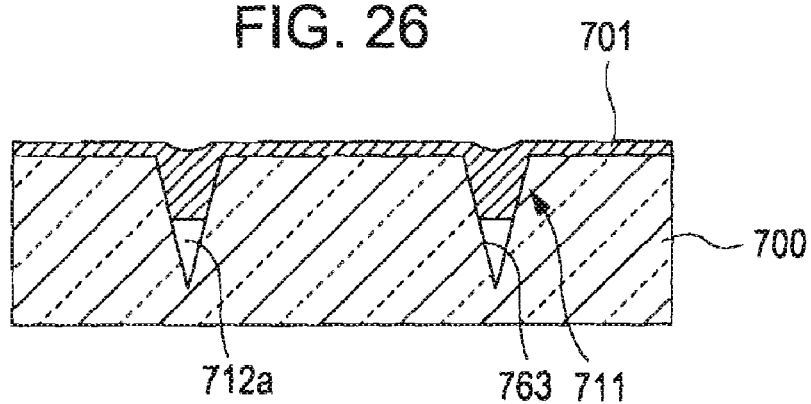
FIG. 26 is a sectional view illustrating a step for manufacturing the liquid crystal panel showing in FIG. 25.

As shown in FIG. 26, the grooves 763 are formed in the surface of the counter substrate 700. A metal film 701 is formed on the surface of the counter substrate 700 having the grooves 763 formed therein by CVD or sputtering using a metal material such as Cr, Ni, Al, Pt, Au, Ag, Ti, Tw, or Mo. Since the width of the tips of the grooves 763 is as small as about 1.0 μm metal molecules do not reach the tips of the grooves 763 in a CVD or sputtering process, thereby forming the hollow portions 712a when the metal film 701 is formed on the counter substrate 700.

Figure 27:
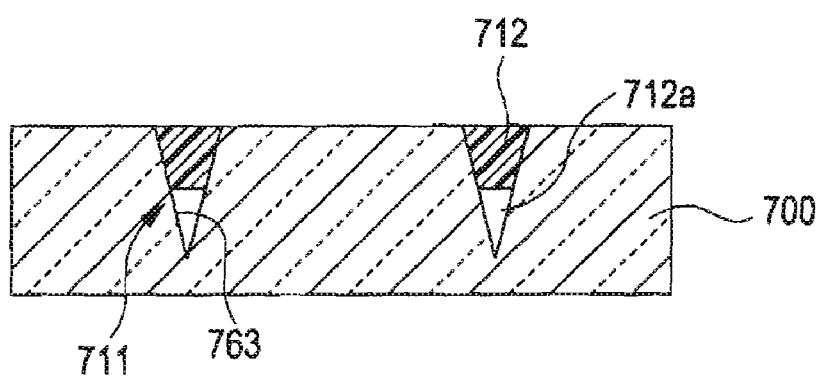
FIG. 27 is a sectional view illustrating a step for manufacturing the liquid crystal panel shown in FIG. 25.
Figure 28:
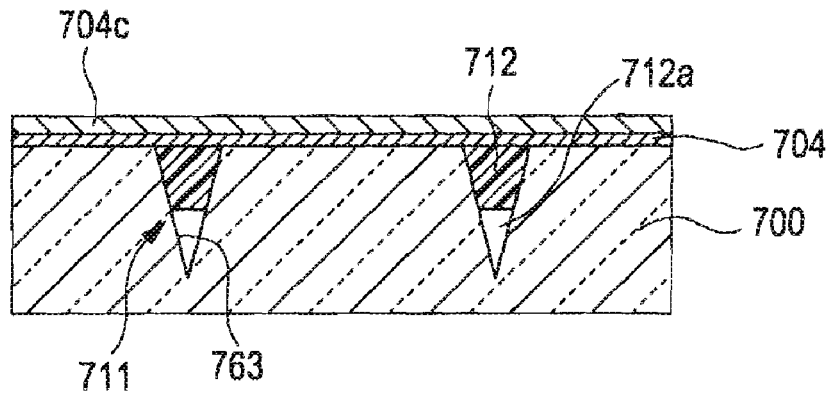
FIG. 28 is a sectional view illustrating a step for manufacturing the liquid crystal panel shown in FIG. 25.

Next, as shown in FIG. 27, the surface of the metal film 701 is etched off in order to make the surface of the counter substrate 700 flush with the surface of the metal film 701. Then, as shown in FIG. 28, a common electrode 704 is formed on the surface of the counter substrate 700 and the surface 712b of the filler 712, and an alignment film 704c is formed on the common electrode 704.

In accordance with this embodiment, the filler 712 is composed of the metal material, and thus the filler 712 filling in the grooves of the counter substrate 700 also functions as a light-shielding portion. Therefore, the light-shielding portion is provided in the grooves without projecting to the surface of the counter substrate 700. As a result, the quantity of light transmitted through the counter substrate 700 is not decreased, thereby effectively use light. In addition, since an inorganic material with high light resistance, such as a metal material, is used, the material is little broken or deformed, and thus the liquid crystal panel 720R has high reliability.

Seventh Embodiment

Next, a seventh embodiment of the invention will be described. Like in the fifth embodiment, in this embodiment, hollow portions are formed at the tips of prism elements. This embodiment is different from the fifth embodiment in shape of grooves of prism elements. Therefore, this point is mainly described.

Figure 29:
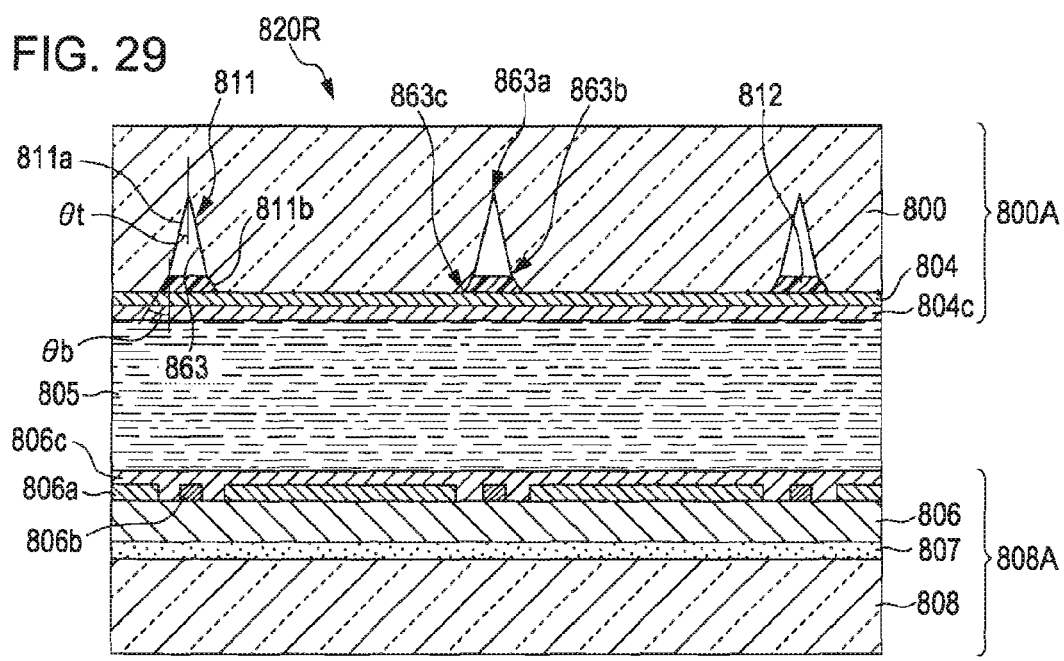
FIG. 29 a partial sectional view showing the configuration of a liquid crystal panel according to a seventh embodiment of the invention.

FIG. 29 is a sectional view showing the configuration of a liquid crystal panel 820R.

Each of prism elements 811 serves as an optical path deflecting portion having a groove 863 extending inward from the inner surface of a counter substrate 800. Like in the first embodiment, a filler 812 composed of, for example, an acrylic resin as a raw material, is provided in the grooves 863.

As shown in FIG. 29, in this embodiment, the inclined surfaces of the grooves 863 of prism elements 811 formed in the counter substrate 800 are inclined in two steps. Namely, in a sectional shape of each groove 863, the relation, θt<θb, is satisfied, wherein θt is the inclination angle of the inclined surface 811a extending from the tip 863a of the groove 863 to an intermediate portion 863b with respect to the normal direction to the surface of the counter substrate 800, and θb is the inclination angle of the inclined surface 811b extending from the intermediate portion 863b to the opening 863c of the groove 863 with respect to the normal direction to the surface of the counter substrate 80.

The inclination angle of the inclined surface 811b extending to the intermediate portion 863b as a boundary is larger than that of the inclined surface 811a with respect to the normal direction to the surface of the counter substrate 800. Therefore, in the whole of the groove 863, the tip side held between the inclined surfaces 811a is relatively narrow, and the opening side surrounded by the inclined surfaces 811b is relatively wide. In addition, the filler 812 is provided to be held between the inclined surfaces 811b of the grooves 863, i.e., provided in relatively wide portions of the grooves 863. The filler 812 is not provided on the inclined surface 811a side. In this shape, a fluid material is easily filled in necessary portions without being filled in the inclined surface 811b side, thereby easily realizing low-refraction spaces. Thus, it may be possible to easily achieve total reflection over a wide range of incidence angles and contribute to a decrease in the amount of the material used. The other configuration is the same as in the fifth embodiment.

As described above, the inclined surfaces of the grooves 863 of the prism elements are formed by dry etching using, for example, $CHF_3$ gas. In this case, the inclined surfaces are formed in two steps by, for example, changing the temperature of the counter substrate 800 during etching. For example, when the inclined surfaces 811b on the opening 863c side are formed, the temperature of the counter substrate 800 is about 9° C. during etching, while when the inclined surfaces 811a on the tip 863a side are formed, the temperature of the counter substrate 800 is about 156° C. during etching.

(Reflection Angle and Emission Angle)

Figure 30:
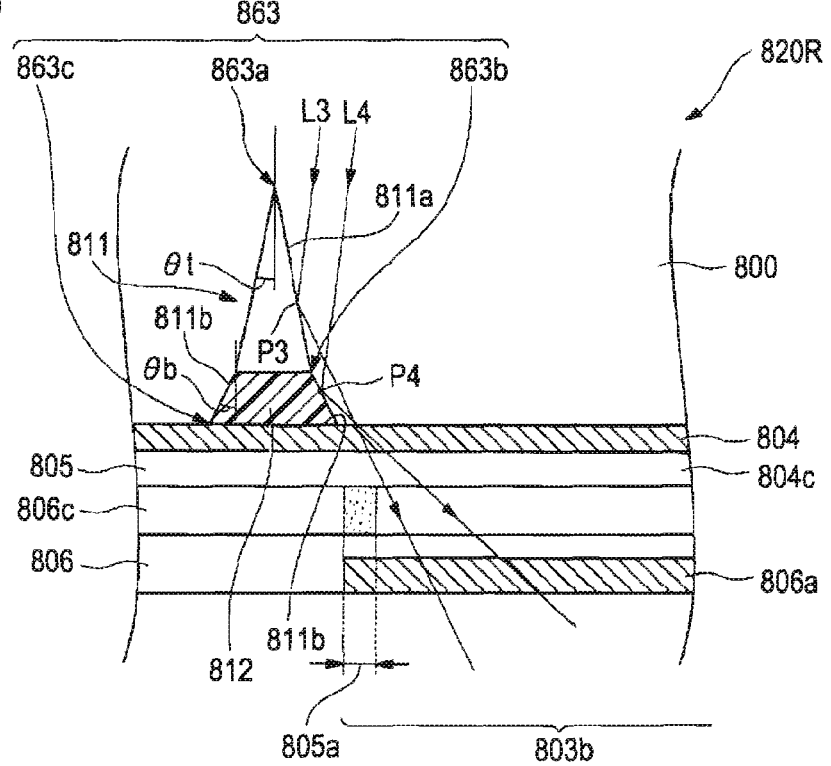
FIG. 30 is a drawing illustrating the operation of a prism element.

Next, the operation of the prism elements 811 will be described with reference to FIG. 30. FIG. 30 is a schematic drawing showing the optical paths of light beams L3 and L4 incident on the liquid crystal panel 820R. FIG. 30 shows a light beam along a straight optical path for the sake of convenient description.

First, the light beam L3 is described. The light beam L3 incident on the counter substrate 800 travels in the counter substrate 800 and is incident on position P3 of the inclined surface 811a on the tip 863a side of each prism element 811 and completely reflected at the position P3. The optical path of the completely reflected light beam L3 is deflected toward apertures 803b and the light beam L3 is incident on the apertures 803b. The light beam L3 incident on the apertures 803b is transmitted through a liquid crystal layer 805, pixel electrodes 806, and a TFT array substrate 808 and then emitted from the TFT array substrate 808.

Next, the light beam L4 is described. The light beam L4 incident on the counter substrate 800 travels in the counter substrate 800 and is incident on position P4 of the inclined surface 811b on the opening 863c side of each prism element 811 and completely reflected at the position P4. Like the light beam L3, the optical path of the completely reflected light beam L4 is deflected toward the apertures 803b and the light beam L4 is incident on the apertures 803b. The light beam L4 incident on the apertures 803b is transmitted through the liquid crystal layer 805, the pixel electrodes 806, and the TFT array substrate 808 and then emitted from the TFT array substrate 808.

Since the inclination angle θb of the inclined surfaces 811b is larger than the inclination angle θt of the inclined surfaces 811a, movement of the light beam L4 by total reflection toward the apertures 803b (to the right side in the drawing) is larger than that of the light beam L3. Therefore, the light beam L4 reflected at the inclined surfaces 811b travels to the central side of the pixel region as compared with the light beam L3. Thus, the light beams L3 and L4 are completely reflected to travel avoiding a non-orientation region 805a of the liquid crystal layer 805.

In accordance with this embodiment, the inclination of the inclined surfaces 811b with respect to the normal direction to the surface of the counter substrate 800 is larger than that of the inclined surfaces 811a. Therefore, the grooves 863 are relatively wide on the opening 863c side and relatively narrow on the tip 863a side. For example, when the filler 812 is filled using a material with high fluidity, the material hardly reaches the tip 863a side. As a result, hollow portions are easily formed on the tip 863a side. In addition, since the filler 812 is disposed on the inclined surfaces 811b with a larger inclination with respect to the normal to the surface of the counter substrate 800, it may be possible to stably dispose the filler 812 as compared with the case in which the filler 812 is disposed on the inclined surfaces 811a.

Furthermore, light incident on the counter substrate 800 is completely reflected by the inclined surfaces 811a and 811b, and thus reflected light easily gather at the central portion of the pixel region. Therefore, reflected light travels avoiding the non-orientation region 805a of the liquid crystal layer 805, thereby decreasing a light loss and effectively utilizing light.

In this embodiment, the inclined surface of each groove 863 includes the inclined surfaces 811a and 811b in two steps between the tip 863a and the opening 863c. However, the grooves are not limited to this. For example, the inclined surfaces may be formed in curved surfaces curved toward the centers of the grooves 863 without the intermediate portions 863b.

Eighth Embodiment

An eighth embodiment of the invention will be described with reference to FIG. 31. Since this embodiment is different from the first embodiment in constitute on of inclined surfaces of prism elements, this point mainly described.

Figure 31:
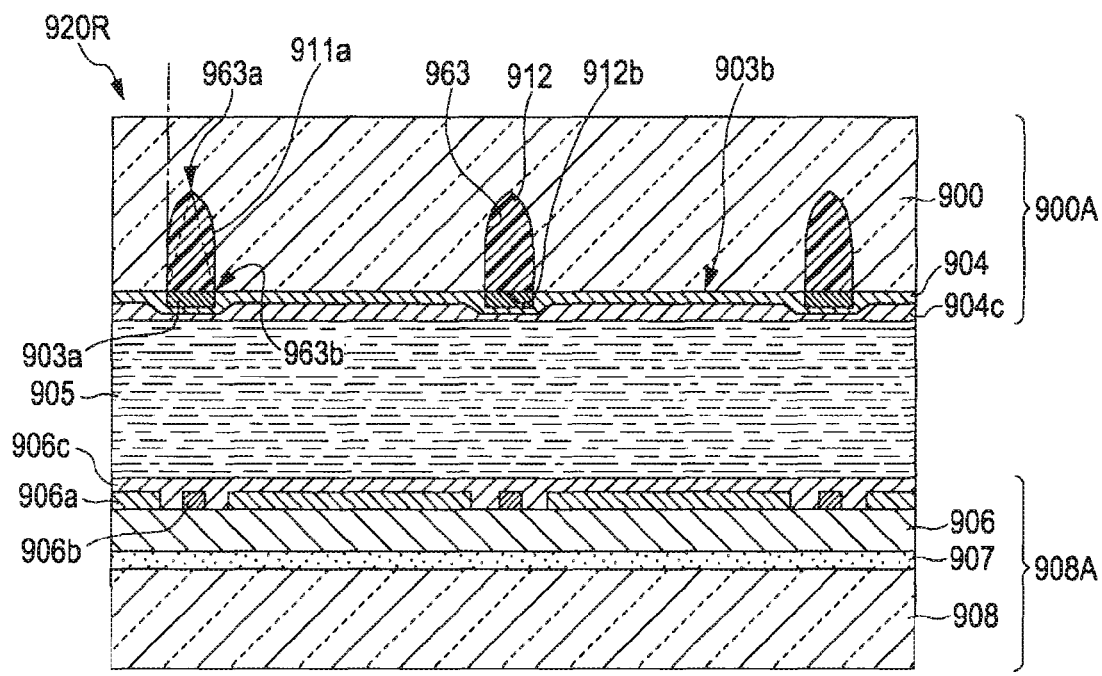
FIG. 31 a partial sectional view showing the configuration of a liquid crystal panel according to an eighth embodiment of the invention.

FIG. 31 is a sectional view showing the configuration of a liquid crystal panel 920R.

Each of prism elements 911 serves as an optical path deflecting portion having a groove 963 extending inward from the inner surface of a counter substrate 900, and a filler 912 composed of, for example, an acrylic resin as a raw material is provided in the grooves 963.

As shown in FIG. 31, the side surfaces of the grooves 963 are curved surfaces 911a. In a sectional shape of each groove 963, the curved surface 911a is provided outside (between the ends of the opening of the groove 963 and the center thereof shown in the drawing) straight lines (broken line in the drawing) which connects the tip 963a and the ends of the opening 963b of the groove 963. In this embodiment, the curves surfaces are curved outward in the width direction of the grooves 963. Namely, the curved surfaces 911a are formed as the sides of the grooves 963 so that the curved surfaces 911a are curved outward in the width direction from virtual lines (broken lines in the drawing) which connect the tip 963a and both ends of the opening 963b of each groove 963. In this case, the tip 963a corresponds to a point on each groove 963, the point being provided on a median between both ends of the opening 963b shown in FIG. 31.

Furthermore, each groove 963 has a sectional shape in which the curved surface 911a is provided inside (between the ends of the opening of the grove 963 and the center thereof) virtual lines (one-dot chain lines in the drawing) passing through the ends of the opening 963b and being vertical to the surface of the counter substrate 900. In this embodiment, the curved surfaces are formed to be curved inwardly from the virtual nines (the one-dot chain lines) in the width direction. Also, in this embodiment, the curved surfaces 911a have a constant curvature. Like in the first embodiment, the grooves 963 are filled with a filter 912 composed of, for example, an acrylic resin, in a region from the tips 963a to the openings 063b.

In addition, the curved surfaces 911a are formed inside the normal lines to the surface of the counter substrate 900 at the ends of the openings 963b so that the grooves 963 are curved outward on the tip side. The surface 912b of the filler 912 is flush with the inner surface of the counter substrate 900. Furthermore, a black matrix 903a is disposed on the filler 912 to overlap the grooves 963 in a plan view.

The curved surfaces 911a of the grooves 963 of the prism elements 911 having the above-described configuration may be formed by dry etching with, for example, $CHF_3$ gas. In this case, the curved surfaces are formed by, for example, stepwisely changing the temperature of the counter substrate 900 during etching. For example, when the openings 963c are formed, the temperature of the counter substrate 900 is set to about 156° C. during etching, and the temperature of the counter substrate 900 is gradually decreased as the depth of the grooves 963 increases. In forming the tips 963a, the temperature of the counter substrate 900 is decreased to about 9° C. during etching.

For example, when the grooves 963 are filled with the filler 912, a fluidized acrylic resin used as a material for the filler 912 is preferably filled. In this case, since the grooves 963 are curved outward on the tip side thereof, the fluidized resin material is diffused to the tips 963a of the grooves 963 within a short time.

In this embodiment, the curved surface 911a of each groove 963 is formed outside the virtual lines connecting the ends of the opening 963b and the tip 963a. Therefore, in filling the grooves 963 with the filler 912, the fluidized acrylic resin used as a material for the filler 912 is easily diffused to the tips 963a of the grooves 963, thereby facilitating filling of the filler 912. In this embodiment, even when the filler 912 is a metal or another material, the effect of easily diffusing the material to the tips 963a of the grooves 963 may be obtained.

In this embodiment, the curved surface 911a of each groove 963 is formed inside the virtual lines passing through the ends of the opening 963b and being vertical to the surface of the counter substrate 900. Therefore, light transmitted through the counter substrate 900 is securely completely reflected by the curved surfaces 911a toward the apertures 903b, thereby facilitating collection of the light.

Ninth Embodiment

Figure 32:
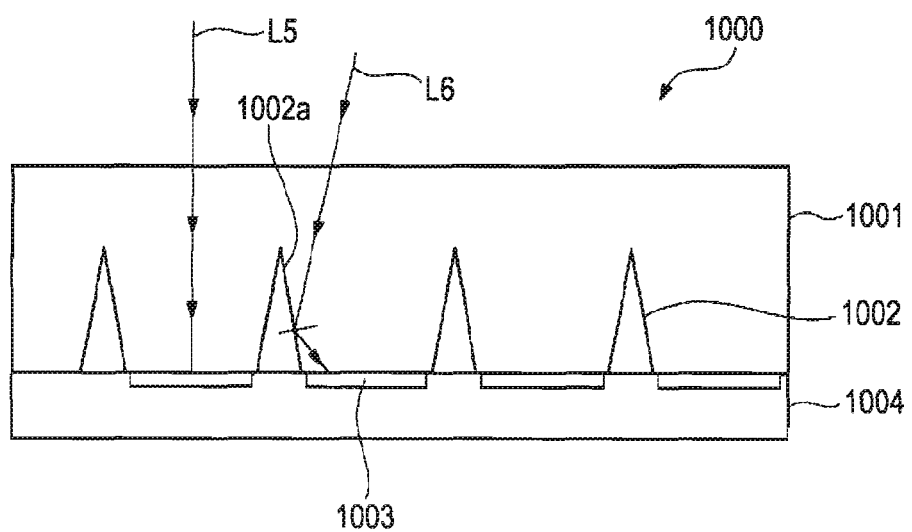
FIG. 32 a partial sectional view showing the configuration of an electronic apparatus according to a ninth embodiment of the invention.

An electronic apparatus according to a ninth embodiment including an electro-optic device according to an embodiment of the invention will be described with reference to FIG. 32. In this embodiment, an image light-sensitive element including any one of the above-described prism elements 211 to 911 is described as an electronic apparatus.

For example, an image light-sensitive element 1000 is a COD or C-MOS sensor. A light beam L5 incident from the outside is transmitted through a dust-proof glass 1001 including a parallel plate and is then incident on semiconductor light-sensitive elements 1003. In the case of a line sensor, the semiconductor light-sensitive elements 1003 are provided in a line.

In the case of a two-dimensional sensor, the semiconductor light-sensitive elements 1003 are provided in, for example, a predetermined rectangular region. In addition, prism elements 1002 having the same configuration as described above are formed in the dust-proof glass 1001. A light beam L6 incident on the inclined surfaces 1002a of the prism elements 1002 is completely reflected by the inclined surfaces 1002a toward the semiconductor light-sensitive elements 1003. Therefore, the incident light beams L5 and L6 are efficiently guided to the semiconductor light-sensitive elements 1003. As a result, a high-sensitive image light-sensitive element 1000 is obtained.

The technical field of the invention is not limited to the above-described embodiments, and appropriate changes may be made within the scope of the gist of the invention.

For example, as shown in FIGS. 33A to 33H, the sectional shape of a prism element may be variously changed according to purposes.

Figure 33A:
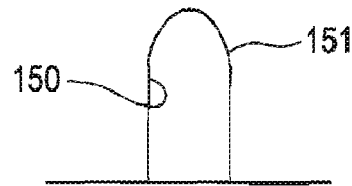
FIGS. 33A to 33H are partial sectional views showing other configurations of prism elements according to an embodiment of the invention.
Figure 33B:
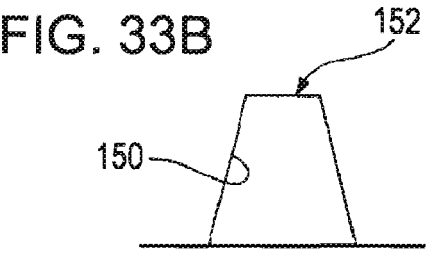
Figure 33C:
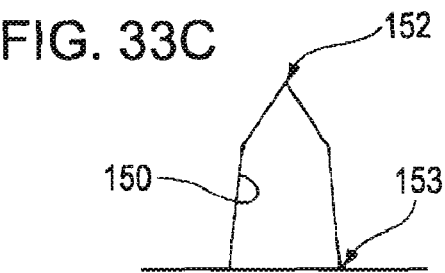
Figure 33D:
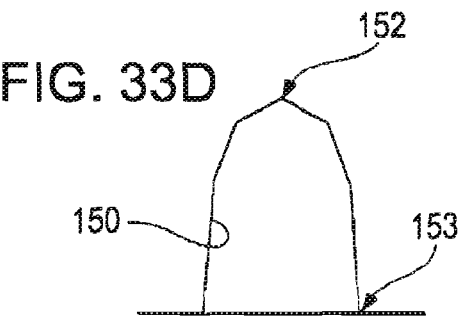
Figure 33E:
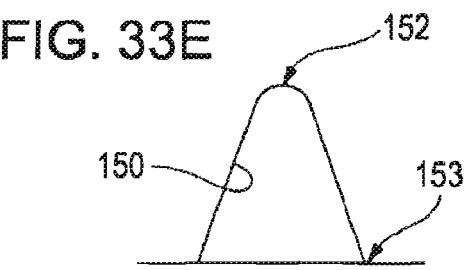
Figure 33F:
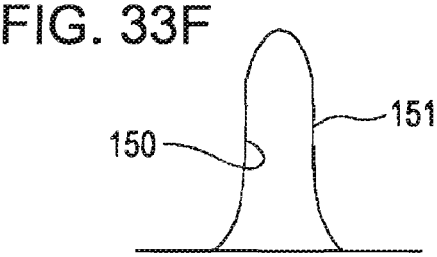
Figure 33G:
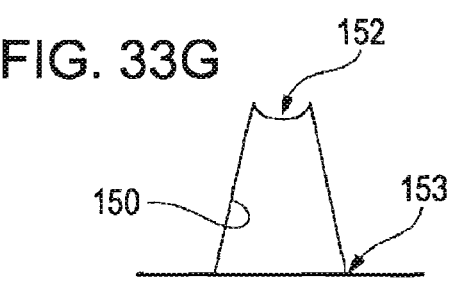
Figure 33H:
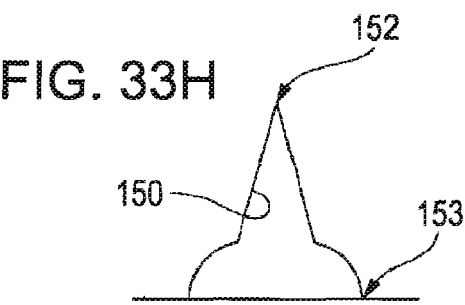

For example, a prism element may have a sectional shape in which the curvature of a curved surface 151 of a groove 150 is not constant (FIG. 33A), a sectional shape in which the tip 152 of a groove 150 is horizontal, i.e., the tip 152 is formed as a bottom (FIG. 33B), or a sectional shape in which a surface ranging from the tip 152 to the opening 153 of a groove 150 is inclined two steps or three or more steps (FIGS. 33C and 33H).

The side surface ranging from the tip 152 to the opening 153 of a groove 150 may have a combination of an inclined surface and a curved surface, and, for example, the tip 152 of a groove 150 may be formed in a curved surface (FIG. 33E). In this case, a filler is easily diffused to the tip 152 of the groove 150.

In addition, a curved surface 151 of a groove 150 may be partially curved inward (FIG. 33F) or the tip 152 of a groove 150 may be curved toward the opening side (FIG. 33G). In this case, the groove 150 is easily formed in a counter substrate.

Furthermore, the side surface from the tip 152 to the opening of a groove 150 may be formed in two steps so that a portion from the tip 152 to an intermediate position 154 is formed in an inclined surface with a constant inclination angle and a portion from the intermediate position 154 to the opening 153 is formed in a outwardly curved surface on the opening side (FIG. 33H). In FIG. 33H, the curved surface is curved outward in a portion at the intermediate position 154. In this case, a filler is easily held in a wide portion at the intermediate position 154.

For example, in FIGS. 33B, 33E, 33G, and 33H, light may be transmitted at the tip 152 of the groove 150 without being completely reflected according to the incidence angle. Therefore, a reflective film is preferably formed on the inner surface of the groove 150, thereby improving the light utilization efficiency.

In each of the embodiments, a metal material such as Cr, Ni, Al, Pt, Au, Ag, Ti, Tw, or Mo may be used as a material for any one of the fillers 212 to 912. In this case, light is directly reflected by any one of the fillers 212 to 219. In addition, a resin material containing particles of the metal may be used. In this case, when the resin material is fluidized, any one of the fillers 212 to 912 is filled in grooves by a simple method such as an ink jet method or the like.

A resin material containing silica fine particles may be used. In this case, the silica is preferably modified so that a modification factor represented by the product of the hydrophobing rate of a silanol group and the total carbon number of an alkyl group is 0.45 to 8. When such a modified silica is added to a resin material, a composition with excellent transparency and rigidity is obtained.

When such a composition is used, a substrate may be deformed to hinder the function of each functional element provided in a liquid crystal device when the thermal expansion coefficient of a filler is greatly different from that of the substrate. Therefore, the thermal expansion coefficient of the composition is preferably controlled to be substantially the same as that of a counter substrate. When a filler composed of such a material is filled, the resin material is cured by heating to a predetermined temperature in a chamber. However, the shape of the filler is not distorted because the thermal expansion coefficient of the composition is substantially the same as that of the counter substrate.

What is claimed is:

1. An electro-optic device comprising:
   a first substrate;
   a second substrate;
   an electro-optic material held between the first and second substrates;
   a groove in the electro-optic material-side surface of the first substrate to form a prism element in order to condense light incident on the first substrate;
   a filler at least partially filling the groove; and
   a light-shielding material provided on the first substrate, the light-shielding material directly contacting at least a surface of the filler in a plan view, wherein:
   the filler forms a bed that supports the light-shielding material; and
   the filler contains a metal material or an opaque material other than the metal material.

2. The electro-optic device according to claim 1, wherein:
   the groove is filled with the filler to form a hollow portion therein; and the light-shielding material is provided to overlap at least the surface of the filler in a plan view.

3. The electro-optic device according to claim 1, wherein the groove has a first inclined surface provided on a tip side and inclined at a first angle with a normal to a surface of the first substrate, and a second inclined surface provided on a opening side and inclined at a second angle larger than the first angle with the normal to the surface of the substrate.

4. The electro-optic device according to claim 3, wherein the filler is filled to be disposed on the second inclined surface.

5. The electro-optic device according to claim 1, wherein the refractive index of the filler differs from that of the first substrate.

6. The electro-optic device according to claim 5, wherein the filler is composed of a material having a lower refractive index than that of the first substrate.

7. The electro-optic device according to claim 1, wherein a thermal expansion coefficient of the filler is substantially the same as that of the first substrate.

8. A projector comprising the electro-optic device according to claim 1.

9. An electronic apparatus comprising the electro-optic device according to claim 1.

10. A method for manufacturing an electro-optic device including a pair of substrates and an electro-optic material held between the pair of substrates the method comprising:

forming a groove in the electro-optic material-side surface of one of the pair of substrates to provide a prism element for condensing light incident on the substrate;

filling the groove with a filler so as to provide a hollow portion in the groove; and disposing a light-shielding material constituting the electro-optic device directly on the surface of the filler so as to contact at least the surface of the filler in a plan view, wherein the filler forms a bed that supports the light-shielding material.

11. A method for manufacturing an electro-optic device including a pair of substrates and an electro-optic material held between the pair of substrates, the method comprising:

forming a groove in the electro-optic material-side surface of one of the pair of substrates to provide a prism element for condensing light incident on the substrate;

pouring a fluid material into the groove so as to provide a hollow portion in the groove;

curing the fluid material poured into the groove; and disposing a light-shielding material constituting the electro-optic device directly on a surface of the cured fluid material so as to directly contact at least the cured fluid material in a plan view, wherein the cured fluid material forms a bed that supports the light-shielding material.

* * * * *